(12) United States Patent
Serra et al.

(10) Patent No.: US 11,085,781 B2
(45) Date of Patent: Aug. 10, 2021

(54) SYSTEM AND METHOD FOR SCHEDULING MULTIPLE MODES OF TRANSPORT WITH INCOMPLETE INFORMATION

(71) Applicant: Mitsubishi Electric Research Laboratories, Inc., Cambridge, MA (US)

(72) Inventors: Thiago Serra, Quincy, MA (US); Arvind Raghunathan, Medford, MA (US); David Bergman, Wethersfield, CT (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 227 days.

(21) Appl. No.: 16/284,229

(22) Filed: Feb. 25, 2019

(65) Prior Publication Data
US 2020/0272954 A1 Aug. 27, 2020

(51) Int. Cl.
| | |
|---|---|
| *G01C 21/00* | (2006.01) |
| *G06Q 50/00* | (2012.01) |
| *G01C 21/34* | (2006.01) |
| *G06Q 10/04* | (2012.01) |
| *G06Q 10/06* | (2012.01) |

(Continued)

(52) U.S. Cl.
CPC ........ *G01C 21/3438* (2013.01); *B60N 2/002* (2013.01); *G01C 21/343* (2013.01); *G01C 21/3415* (2013.01); *G01C 21/3423* (2013.01); *G06N 20/00* (2019.01); *G06Q 10/047* (2013.01); *G06Q 10/06312* (2013.01); *G08G 1/005* (2013.01); *G08G 1/20* (2013.01); *G08G 1/202* (2013.01); *G06F 16/29* (2019.01); *G06F 16/9537* (2019.01); *G06N 5/04* (2013.01); *G06N 20/20* (2019.01)

(58) Field of Classification Search
None
See application file for complete search history.

(56) References Cited

U.S. PATENT DOCUMENTS

| | | | | |
|---|---|---|---|---|
| 2010/0299177 A1* | 11/2010 | Buczkowski | .......... | G06Q 50/30 705/7.13 |
| 2010/0305984 A1* | 12/2010 | Ben-Yitschak | ...... | G06Q 10/025 705/6 |

(Continued)

*Primary Examiner* — Gurkanwaljit Singh
(74) *Attorney, Agent, or Firm* — Gennadiy Vinokur; Hironori Tsukamoto

(57) ABSTRACT

Systems and methods for scheduling early riders (ERs) and late riders (LRs) to vehicles in a multi-modal transportation network (MTN). Stored instructions, when executed, cause a processor to perform acts of forecasting a finite set of scenarios, each scenario having a possible set of forecast LRs (FLRs) itinerary requests. Iteratively, generate ER groups and FLR groups for each scenario, based on a desired time of arrival at a destination. Assign a commuter vehicle (CV) for each ER and FLR group in each scenario. Iteratively, determine for each ER and FLR group a start time and an arrival time at the destination in the corresponding CV, for which, the ER and FLR group are assigned. The iterations continue until a joint schedule for the ERs and the FLRs form each scenario that minimizes an objective function. Formulate assignment information, and transmit the assignment information to the ERs and the assigned CVs.

21 Claims, 25 Drawing Sheets

(51) Int. Cl.
  *G08G 1/00*      (2006.01)
  *B60N 2/00*      (2006.01)
  *G08G 1/005*     (2006.01)
  *G06N 20/00*     (2019.01)
  *G06N 20/20*     (2019.01)
  *G06F 16/29*     (2019.01)
  *G06F 16/9537*   (2019.01)
  *G06N 5/04*      (2006.01)

(56) References Cited

U.S. PATENT DOCUMENTS

| | | | |
|---|---|---|---|
| 2013/0317884 A1* | 11/2013 | Chidlovskii | G06Q 10/063 |
| | | | 705/7.31 |
| 2015/0091507 A1* | 4/2015 | Hyde | B60L 53/63 |
| | | | 320/108 |
| 2017/0178044 A1* | 6/2017 | Wang | G06Q 10/04 |
| 2017/0262770 A1* | 9/2017 | Purdy | G06N 20/20 |
| 2017/0330112 A1* | 11/2017 | Chidlovskii | G06Q 30/0202 |
| 2018/0017405 A1* | 1/2018 | Chen | H04W 4/02 |
| 2018/0038706 A1* | 2/2018 | Ellenby | G01C 21/3423 |
| 2018/0165783 A1* | 6/2018 | Edakunni | H04L 67/12 |
| 2018/0209803 A1* | 7/2018 | Rakah | G01C 21/343 |
| 2018/0211124 A1* | 7/2018 | Rakah | G06Q 50/30 |
| 2018/0211186 A1* | 7/2018 | Rakah | B60W 60/00253 |
| 2018/0211541 A1* | 7/2018 | Rakah | B60W 60/00253 |
| 2018/0224866 A1* | 8/2018 | Alonso-Mora | G06N 5/04 |
| 2020/0160709 A1* | 5/2020 | Ramot | G06Q 10/109 |
| 2020/0182637 A1* | 6/2020 | Kumar | G06Q 50/14 |

\* cited by examiner

500

510 — Separate the ER $\mathcal{J}$ and FLR $\tilde{\mathcal{J}}(q)$ for $q \in Q$ and $\tilde{\mathcal{J}}(q,d)$ for $d \in \mathcal{D}, q \in Q$ in each scenario passengers by destination into sets $\mathcal{J}(d)$ 520 — Construct a decision diagram for ER $D^d = (N^d, A^d)$ for $d \in \mathcal{D}$.
Construct a decision diagram for FLR $D^{d,q} = (N^{d,q}, A^{d,q})$ for $d \in \mathcal{D}, q \in Q$.
Compute the set of feasible pairings $\tilde{A}^{d,q}$ for $d \in \mathcal{D}, q \in Q$.

530 — Define optimization variables: $y_a \in \{0,1\}$ $a \in A^d$ indicating choice of arc $a$
$y_a^q \in \{0,1\}$ $a \in A^{d,q}$ indicating choice of arc $a$
$z_{a1,a2}^q \in \{0,1\}$ $q \in Q, a \in \tilde{A}^{d,q}$ indicating choice of arc $a1, a2$ 540 — Define objective function: $f(\alpha)$
Define the constraints: Eqs. (1a)-(1b), (2a)-(2e)

560 — Solve the optimization problem defined by the objective function and constraints to obtain solution: $y_a^*$ for $a \in A^d, d \in \mathcal{D}$, $y_a^{q*}$ for $a \in A^{d,q}, q \in Q, d \in \mathcal{D}$, $z_{a1,a2}^{q*}$ for $(a1,a2) \in \tilde{A}^{d,q}, q \in Q, d \in \mathcal{D}$.

570 — Set the passenger groupings $\mathcal{G}$ for ER passengers as:
$\mathcal{G} = \{g(a) \mid y_a^* = 1 \text{ for } a \in A^d, d \in \mathcal{D}\}$
Set the passenger groupings $\mathcal{G}(q)$ for FLR passengers in $q \in Q$ as:
$\mathcal{G}(q) = \{g(q,a) \mid y_a^{q*} = 1 \text{ for } a \in A^{d,q}, d \in \mathcal{D}, q \in Q\}$
Set the ER group assignment for each FLR groups in each scenario $q \in Q$ as:
$G^q(g) = g'$ where $z_{a1,a2}^{q*} = 1$ for $g(a2) = g \in \mathcal{G}(q)$ and $g' = g(a1) \in \mathcal{G}$ 580 — Assign for each $j \in \mathcal{J}$: CV start time $t^0(j) : t^a(j)$ if $y_a^* = 1$ and $j \in g(a)$
Fixed schedule trip time $\tilde{t}(c(j), s(j)) : c(j) = \max_{c \in C: \tilde{t}(c,T0) \leq t^0(j)} \tilde{t}(c,T0)$
Assign for each $j \in \mathcal{J}(d,q)$: CV start time $t^0(j) : t^a(j)$ if $y_a^{q*} = 1$ and $j \in g(q,a)$
Fixed schedule trip time $\tilde{t}(c(j), s(j)) : c(j) = \max_{c \in C: \tilde{t}(c,T0) \leq t^0(j)} \tilde{t}(c,T0)$

SYSTEM AND METHOD FOR SCHEDULING MULTIPLE MODES OF TRANSPORT WITH INCOMPLETE INFORMATION

FIELD

The present disclosure relates generally to system and method for scheduling multi-modal transportation network, and more particularly to systems and methods for assigning commuter vehicles (CVs) in a multi-modal transportation network having the CVs and fixed schedule vehicles to known passengers and unknown passengers.

BACKGROUND

Obtaining a multi-modal route through a multi-modal transportation network presents certain challenges. Such transportation networks typically include sub-networks of different types, i.e. associated with different modes of transport. These differences in the properties of the different types of network make it difficult to generate a multi-modal route across both types of network, as a conventional routing and/or scheduling methods tend to be specific to a certain type of transportation network. Current attempts to obtain a multi-modal route involve exploring the different networks separately to determine routes there through. For example, a route may be determined from a departure point through a network associated with one mode of transport to a departure point for another mode of transport, and then a route from the departure point for the other mode of transport to the destination determined through a network associated with the other mode of transport.

Private transport routing, e.g. car routing algorithms, and public transportation routing tend to differ as a result of the different properties of such networks, with the consequence that they cannot readily be integrated to provide a true multi-modal route planner. Some multi-modal route approaches through a multi-modal transportation network, optimize over the public and private transportation network, based on assuming that all the information on the passengers was available ahead of time. However, these types of approaches failed to mention or address an optimization under uncertain information, wherein not all passengers reveal their intended traveling information ahead of time, i.e. as with known scheduled passengers.

Accordingly, there is a need to generate multi-modal routes, that allows a system to provide for a passenger, i.e. rider, to integrate their use of private transport and public transport between an origin and destination of interest. Wherein a subset of passengers, i.e. known passengers/riders, reveal their intended scheduling information ahead of time, and a set of passengers, i.e. uncertain passengers, i.e. unknown passengers, that do not reveal such intended scheduling information at the time of scheduling for the known passengers.

SUMMARY

The present disclosure relates to systems and methods for jointly controlling schedules of passengers/riders for multiple modes of transportation of the multi-modal transportation network (MTN). In particular, utilizing a two-stage stochastic programming formulation for scheduling passengers/riders, wherein the passengers are characterized as a set of early riders/known passengers and late riders/uncertain passengers that are forecast through a finite set of scenarios. The systems and methods of the present disclosure use an optimization approach that is based on decision diagrams to assist in solving for the scheduling problem.

The present disclosure solves some of scheduling problems of conventional scheduling methods, by optimizing passenger scheduling under uncertain information. For example, not all passengers reveal their travel itinerary ahead of time, i.e. uncertain information, whereas known passengers reveal their travel itinerary before traveling the MTN which allows the MTN to schedule the known passengers. These uncertain passengers can place a request for transportation scheduling with the MTN in time, after the known passengers have provided their travel itinerary in time. For example, the uncertain passengers may submit their travel itinerary close in time before traveling, i.e. after the known passengers have placed in time their request for transportation scheduling. It is contemplated that some uncertain passengers can place their travel requests for transportation scheduling while already traveling in the MTN.

At least one reason to address "uncertain information or uncertain passengers" when scheduling passengers in the MTN, by non-limiting example, can be to provide a more efficient overall journey/travel, and/or to reduce the environmental impact. Some consequences of some uncertain passengers not revealing their intended travel information ahead of time, can result, by non-limiting example, in an overcapacity of the MTN, causing an increase in all the passenger travel time which results in a reduction in an efficient overall travel for all passengers. Most conventional scheduling methods fail to address the presents of uncertain passengers when scheduling passengers in a MTN, which results in many problems regarding an increase in passenger travel time, equipment use, fuel consumption and excessive fleet dimensioning. When a scheduling of passengers does not anticipate an inclusion of more passengers, a passenger requesting late service may lead to longer service time for other passengers. When many such passengers are denied service, may if their schedule is not at all possible, one may mistakenly assume that a larger CV fleet is necessary to ensure service in the MTN for late requests.

Specifically, the present disclosure addresses, by non-limiting example, use of vehicles in last-mile passenger/rider transportation, including vehicles, that provide services that delivers passengers/riders from a transportation hub, i.e. terminal station, of a mass transit service for the MTN, to each rider's final destination. These vehicles in last-mile passenger/rider transportation can be defined as commuter vehicles (CVs) and autonomous vehicles, and the like.

In addressing some scheduling problems for passengers/riders across multiple modes of transportation, the multiple modes of transportation can be separated into two or more modes of transport. For example, a first mode of a mass transportation network can be with fixed schedule vehicles, such as a air, boat, bus or train, and a second mode of a transportation network can have flexibility in scheduling CVs, i.e. CVs consisting of vehicles with smaller capacity such as cars operated by drivers, deriverless cars, minibuses, motorized platforms.

The fixed schedule vehicles have fixed schedules and unconstrained passenger capacities to transport a set of passengers between the transportation hubs of the corresponding service. For example, a train only transports passengers between train stations while the bus transports passengers between bus stops. As referred herein, the unconstrained passenger capacities can be understood as that of the maximum capacity of fixed schedule vehicles, which is not considered in the scheduling and controlling solution. In contrast, the CVs have unconstrained schedules, and a maximum passenger capacity to transport the passengers to or from the transportation hub via a route that is chosen according to the destinations of the passengers.

At least some goals, among many goals, of some systems and methods of the present disclosure, is to provide a more efficient overall journey for both known passengers and unknown passengers, as well as to reduce an environmental impact. Other advantages of some systems and methods of the present disclosure, can provide some passengers traveling with a minimum waiting time cost, by maximizing a capacity of the different modes of transportation with the MTN.

Some embodiments of the present disclosure, include a realization that constraints can be implemented when scheduling of passengers for one or more modes of transport in the MTN. For example, some constraints at the time of scheduling include: a passenger capacity level for each terminal station (i.e. transportation hub) at the intended time the passenger is to use the station; a level of a condition state of the terminal station's facilities at the intended time the passenger is to use the station; and a characterization of usability of each station according to reported commuter issues/problems by passengers for that terminal station. Some of the above constraints can address reducing passenger travel cost, reduce an environmental impact and increase passenger confidence and ridership level of satisfaction in the MTN. Most conventional scheduling methods fail to consider the above constraints which results in an inefficient overall journey for increasing passengers wait time cost, and fails to maximize a capacity of the different modes of transportation within the MTN. The systems and methods of the present disclosure overcomes the conventional scheduling methods, utilizing some or all of the above constraints, which may be implemented based on instituting a threshold capacity limit for each station terminal, i.e. relating to CV, train, bus, subway, etc., according to a specific constraint, by an operator.

According to embodiments of the present disclosure, a system for scheduling of early riders (ERs) or known passengers and late riders (LRs) or uncertain passengers, wherein the LRs are unknown at a time the ERs are scheduled, to vehicles in a multi-modal transportation network (MTN). The system including at least one processor connected to an interface and a memory. Stored in the memory is MTN data and ER itinerary requests, and instructions that, when executed by the at least one processor, cause the at least one processor to perform acts including forecasting a finite set of scenarios, each scenario comprising a possible set of forecast LRs (FLRs) itinerary requests. Wherein the finite set of scenarios is generated from past ERs and past LRs completed travel obtained from the MTN data. Iteratively, generate ER groups and FLR groups for each scenario, based on a desired time of arrival at a destination. Assign a commuter vehicle (CV) for each ER and FLR group in each scenario of the finite set of scenarios. Iteratively, determine for each ER and FLR group a start time and an arrival time at the destination in the corresponding CV, for which, the ER and FLR group are assigned. Wherein a total number of riders of all groups traveling in a CV at any given time does not exceed a capacity of the CV, and there exists a route that takes riders from their location to their destination. Wherein the iterations continue until a joint schedule for the ERs and the FLRs from each scenario that minimizes an objective function. Formulate assignment information, and transmit, via the interface, the assignment information to the ERs and the assigned CVs.

A method for scheduling of early riders (ERs) and late riders (LRs), wherein the LRs are unknown at a time the ERs are scheduled, to commuter vehicles (CVs) associated with a transportation system (TS). The method including receiving ERs itinerary requests via an interface. Executing, by a processor connected to the interface and a memory, instructions stored in the memory to cause the processor to perform acts comprising: forecasting a finite set of scenarios, each scenario comprising a possible set of Forecast LRs (FLRs) itinerary requests, wherein the finite set of scenarios are generated from past ERs and past LRs completed travel obtained from TS data stored in the memory. Iteratively, generating ER groups and FLR groups for each scenario, based on a desired time of arrival at a destination, such that a number of CVs concurrently serving the ER groups and the LR groups is less than a fleet capacity. Assigning a CV for each ER and FLR group in each scenario of the finite set of scenarios. Iteratively, determining for each ER and FLR group a start time and an arrival time at the destination in the corresponding CV, for which, the ER and FLR group are assigned, wherein a total number of riders of all groups traveling in a CV at any given time does not exceed a capacity of the assigned CV, and there exists a route that takes riders from their location to their destination. Continuing the iterations until a joint schedule for the ERs and the FLRs form each scenario that minimizes an objective function of a metric that is a combination between a total rider waiting time and a number of CV trips. Formulating assignment information, and transmitting, via the interface, the assignment information to the ERs and the assigned CVs.

According to embodiments of the present disclosure, a system for scheduling of early riders (ERs) and late riders (LRs), wherein the LRs are unknown at a time the ERs are scheduled, to vehicles in a multi-modal transportation network (MTN). The system including at least one processor connected to an interface and a memory, stored in the memory is MTN data and ERs itinerary requests, and instructions that, when executed by the at least one processor, cause the at least one processor to perform acts including forecasting a finite set of scenarios, each scenario comprising a possible set of forecast LRs (FLRs) itinerary requests. Wherein the finite set of scenarios is generated from past ERs and past LRs completed travel obtained from the MTN data. Iteratively, generate ER groups, and FLR groups for each scenario, based on a desired time of arrival at the target destination. Assign a commuter vehicle (CV) for each ER and FLR group in each scenario of the finite set of scenarios. Iteratively, determine for each ER and FLR group a start time and an arrival time at the target destination in the corresponding CV, for which, the ER and FLR group are assigned. Wherein a total number of riders of all groups traveling in a CV at any given time does not exceed a capacity of the CV, and there exists a route that takes riders from their transfer station to their target destination, Wherein the iterations continue until a joint schedule for the ERs and the FLRs form each scenario that minimizes an expectation of a metric that is a combination between a total rider waiting time and a number of CV trips. Formulate assignment information, and transmit, via the interface, the assignment information to the ERs and the assigned CVs. Iteratively, generate LR groups, based on a desired time of arrival at the target destination. Assign a commuter vehicle (CV) for each LR group. Iteratively, determine for each LR group, a period of time including a start time and an arrival time at the target destination in the corresponding CV, providing that the CV for that LR group is either not in use by any ER group for that time period and that there is a rider capacity in the CV to transport all the riders in the LR group, or an ER group using the CV at the same time, and that there is a rider capacity in the CV to transport all the riders in the ER and LR groups. Wherein the iterations continue until a joint schedule for the LRs conditioned on the determined schedule of the ERs, minimizes an objective function of a metric that is a combination between a total LR waiting time and a number of CV trips. Formulate assignment information, and transmit, via the interface, the assignment information to the LRs and the assigned CVs.

According to embodiments of the present disclosure, a system for scheduling of early riders (ERs) and late riders (LRs), wherein the LRs are unknown at a time the ERs are scheduled, to commuter vehicles CVs associated with a transportation system (TS). The system including at least one processor connected to an interface and a memory, stored in the memory is TS data and ERs itinerary requests, and instructions that, when executed by the at least one processor, cause the at least one processor to perform acts including forecasting a finite set of scenarios, each scenario comprising a possible set of forecast LRs (FLRs) itinerary requests. Wherein the finite set of scenarios is generated from past ERs and past LRs completed travel obtained from the TS data. Iteratively, generate ER groups, and FLR groups for each scenario, based on a desired time of arrival at a destination, such that a number of CVs that are concurrently serving the ER groups and the FLR groups is less than a fleet capacity. Assign a commuter vehicle (CV) for each ER and FLR group in each scenario of the finite set of scenarios. Iteratively, determine for each ER and FLR group a start time and an arrival time at the destination in the corresponding CV, for which, the ER and FLR group are assigned. Wherein a total number of riders of all groups traveling in a CV at any given time does not exceed a capacity of the CV, and there exists a route that takes riders from their location to their destination. Wherein the iterations continue until a joint schedule for the ERs and the FLRs form each scenario that minimizes an objective function of a metric that is a combination between a total rider waiting time and a number of CV trips. Formulate assignment information, and transmit, via the interface, the assignment information to the ERs and the assigned CVs.

According to embodiments of the present disclosure, a system for scheduling of early riders (ERs) and late riders (LRs), wherein the LRs are unknown at a time the ERs are scheduled, to vehicles in a multi-modal transportation network (MTN). The system including a processor connected to a transceiver and a memory, stored in the memory is MTN data and ERs itinerary requests, and instructions that, when executed by the at least one processor, cause the at least one processor to perform acts including forecasting a finite set of scenarios, each scenario comprising a possible set of forecast LRs (FLRs) itinerary requests. Wherein the finite set of scenarios is generated from past ERs and past LRs completed travel obtained from the MTN data. Iteratively, generate ER groups, and FLR groups for each scenario, based on a desired time of arrival at a destination. Assign a commuter vehicle (CV) for each ER and FLR group in each scenario of the finite set of scenarios. Iteratively, determine for each ER and FLR group a start time and an arrival time at the destination in the corresponding CV, for which, the ER and FLR group are assigned. Wherein a total number of riders of all groups traveling in a CV at any given time does not exceed a capacity of the CV, and there exists a route that takes riders from their location to their destination. Wherein the iterations continue until a joint schedule for the ERs and the FLRs form each scenario that minimizes an objective function. Formulate assignment information, and transmit, via the transceiver, the assignment information to the ERs and the assigned CVs.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 5 is a flowchart illustrating primary steps in optimizing the scheduling of passengers on fixed schedule vehicles and commuter vehicles using a network flow formulation, according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates to systems and methods for jointly controlling schedules of transport forming at least part of the multi-modal transportation network (MTN) for early riders (ERs)/known passengers and late riders (LRs)/uncertain passengers.

Figure 1:
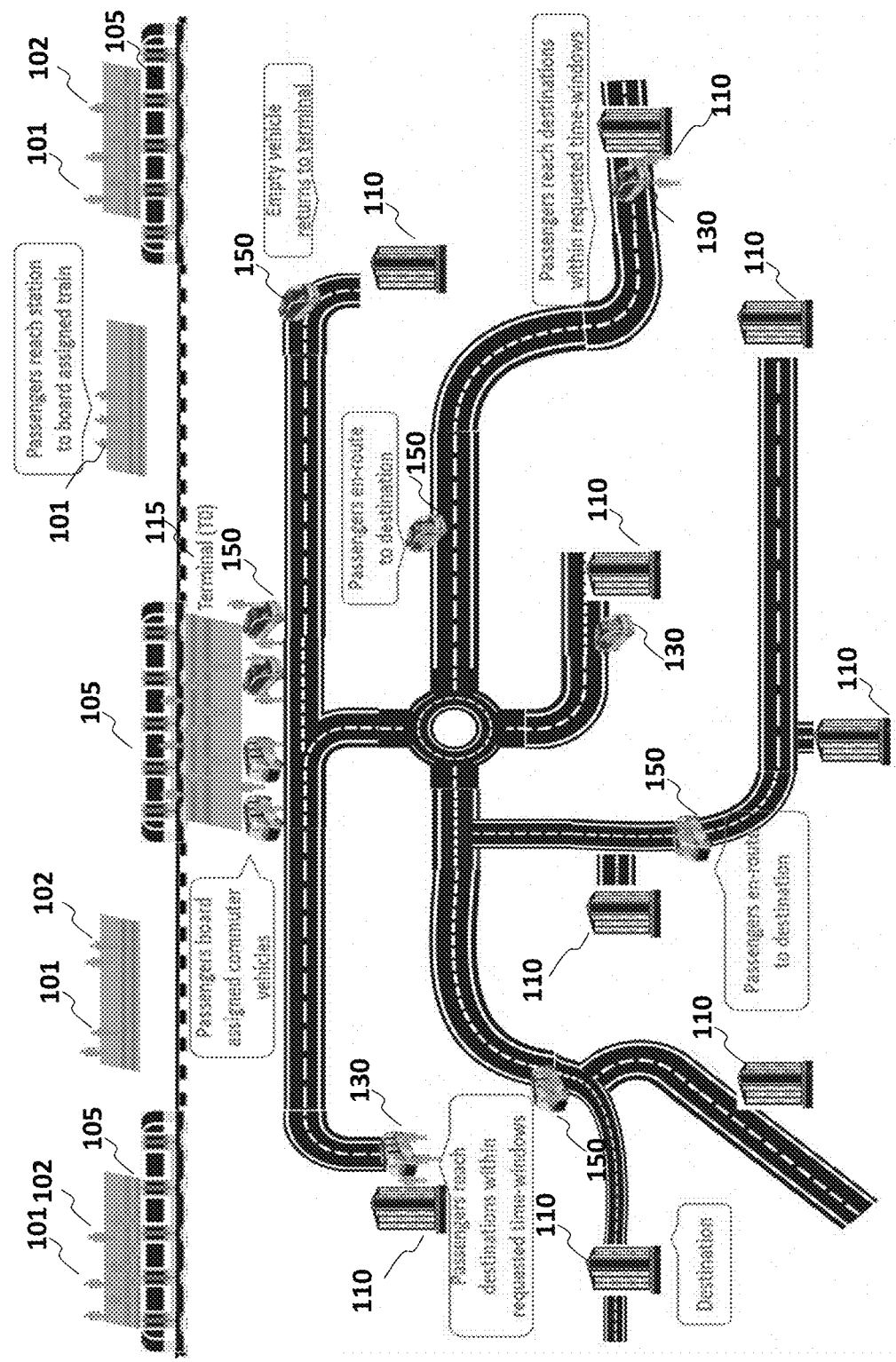
FIG. 1 is a schematic illustrating a system for scheduling commuter vehicles (CVs) in a multi-modal transportation network (MTN) having early riders (ERs)/known passengers and late riders (LRs)/uncertain passengers, according to embodiments of the present disclosure.

FIG. 1 is schematic illustrating an integrated last-mile system, according to embodiments of the present disclosure. FIG. 1 depicts the boarding of ER passengers 101 and LR passengers 102 on a fixed schedule vehicle 105 such as a train, arrival at an intermediate station 115, boarding of passengers on commuter vehicles at the intermediate station, travel by commuter vehicles to reach destinations 120 and arrival at the destinations 110 within the specified time windows of time of arrival 130. Once a passengers is scheduled, that system is used in a same way by both early riders (ERs)/known passengers and late riders (LRs)/uncertain passengers.

For example, embodiments of the present disclosure include joint scheduling of passengers on mass transit systems and last-mile vehicles under uncertainty. Passengers/riders arrive by train to a central terminal and board limited-capacity pods, i.e. commuter vehicles (CVs) which are automated or otherwise operated, where some passengers are early riders (ERs)/known passengers and late riders (LRs)/uncertain passengers (i.e. that request service at a later time than ERs). At least one goal of some embodiments of the present disclosure is to assign passengers/riders to trains and then to group passengers traveling together on a CV so as to minimize a convex combination of two objectives, total travel time and number of CV trips, which in some embodiments may assumed to have a single destination per CV trip or maybe assume to have only a few CV destinations. Such that mixed objective models can be a tradeoff between quality of service (total passenger travel time) and operational costs related to fuel consumption and maintenance requirements (number of CV trips). In the absence of uncertainty, this problem is known as the integrated last-mile transportation problem (ILMTP).

The uncertain setting can be applicable to systems where a central scheduler takes requests from early riders (ERs)/known passengers and assigns them to trains, groups, and departure times, while building in flexibility for late riders (LRs)/unknown passengers that might request transportation services but are yet to submit an associated request to the multi-modal transportation network (MTN). This leads to a significant increase in problem complexity with respect to conventional scheduling methods in this area, but what is realized is that also makes for a more realistic setting where the initial scheduling of passengers must account for additional demand from late requests that also needs to be accommodated.

Figure 2A:
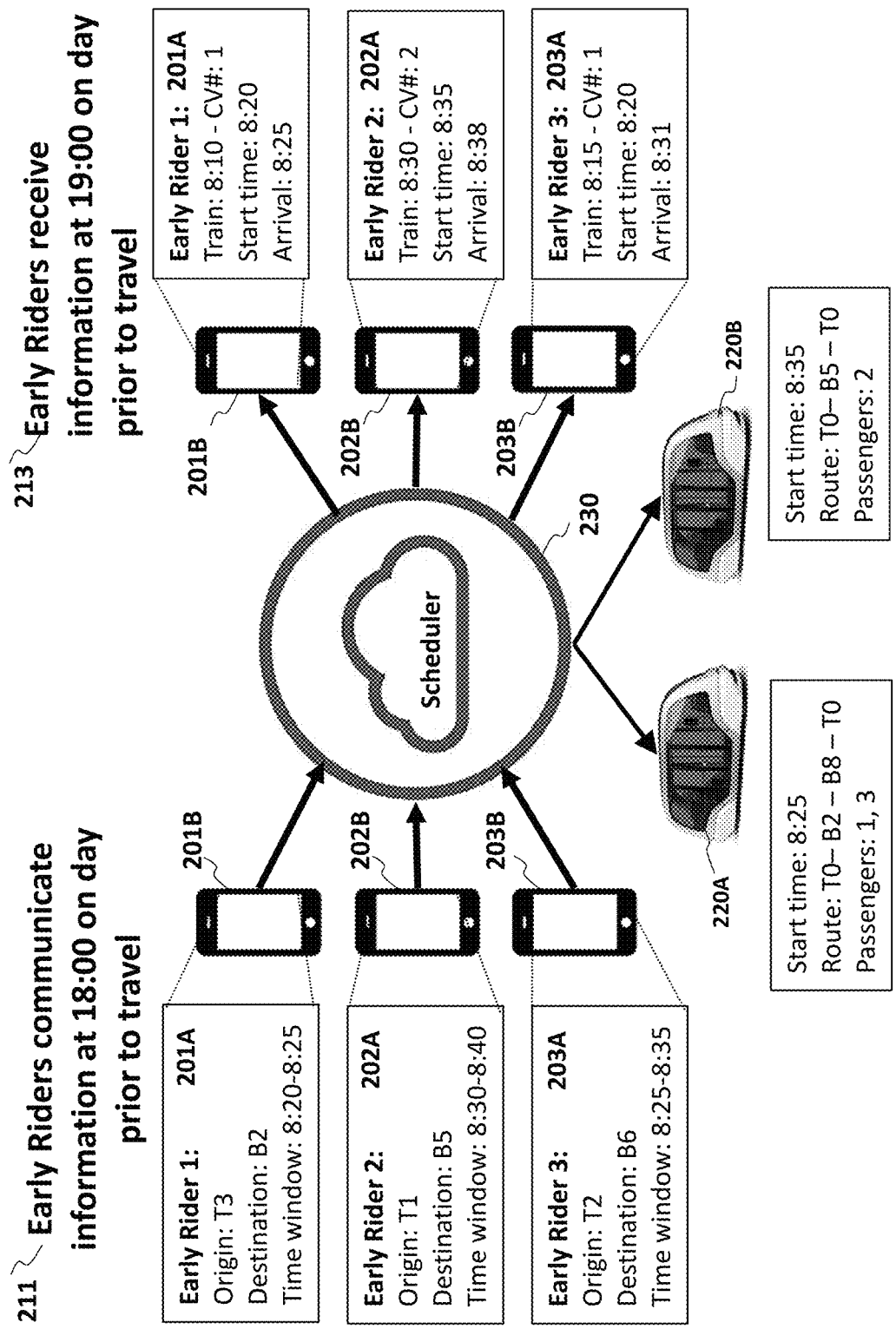
FIG. 2A and FIG. 2B is a schematic illustrating scheduling multiple modes of transportation in the MTN that results in assigning commuter vehicles to efficiently connect with scheduled vehicles in regard to scheduling ERs and LRs, according to some embodiments of the present disclosure.

FIG. 2A is a schematic illustrating scheduling multiple modes of transportation in the multi-modal transportation network (MTN) that results in assigning commuter vehicles to efficiently connect with scheduled vehicles in regard to scheduling riders, according to some embodiments of the present disclosure. FIG. 2A shows an example of a CV assigning system, where the early riders/users/passengers 201A, 202A, 203A provide input to a system (see FIG. 3A) requesting the origin station, destination building and the time-window for arrival at the destination, at a time prior to their intended travel, i.e. before the LRs. As an example, early riders/users/passengers 201A, 202A, 203A communicate information 211 at 18:00 pm on day prior to travel. Wherein each user/passenger 201A, 202A, 203A using their individual smart-phones or computers 201B, 202B, 203B to communicate to the system (see FIG. 3A). The system (see FIG. 3A) determines the CV schedule for the known users 201A, 202A, 203A and the commuter vehicles 220A, 220B.

Figure 2B:
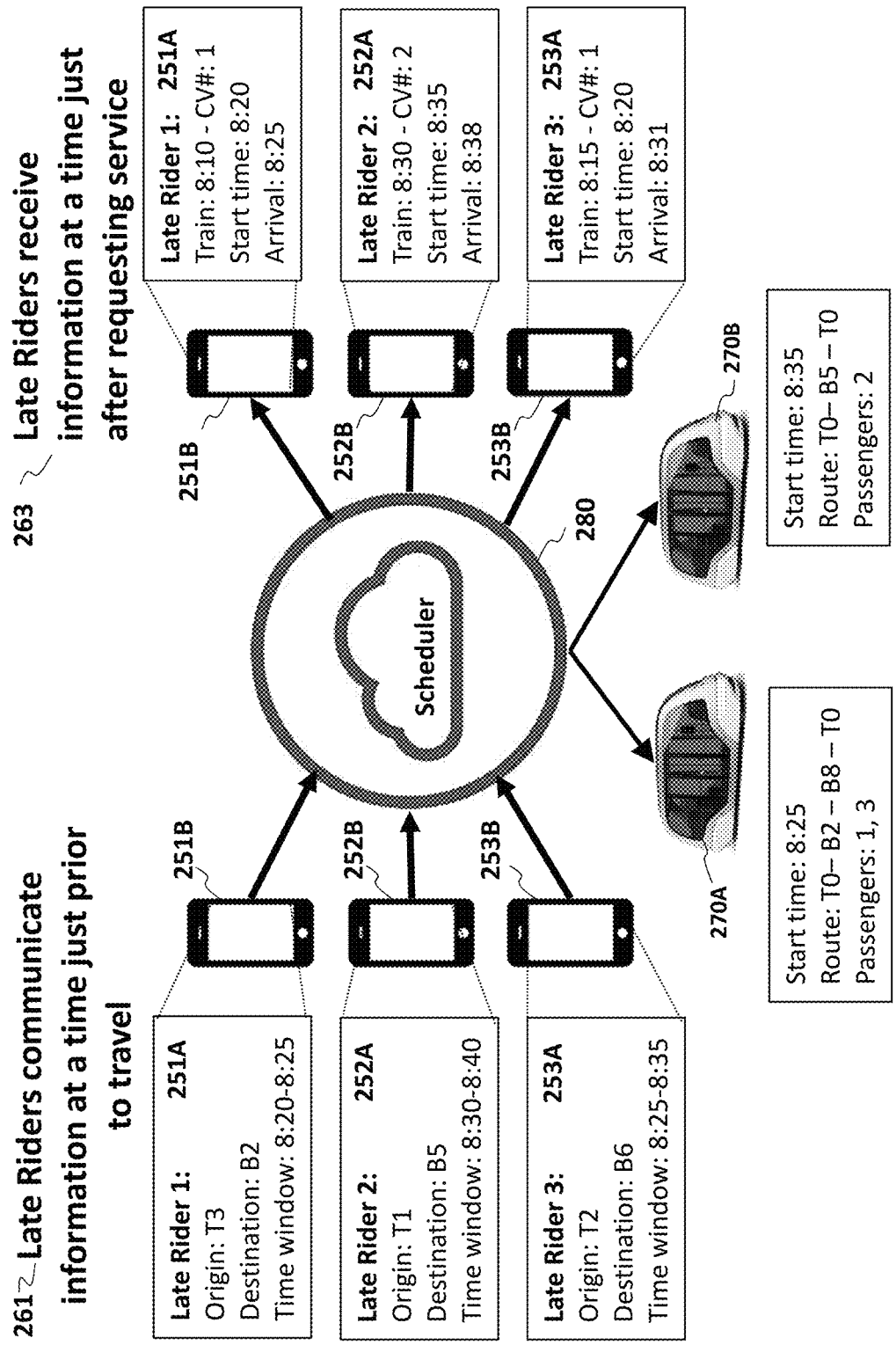

FIG. 2B is a schematic illustrating scheduling multiple modes of transportation in the multi-modal transportation network (MTN) that results in assigning commuter vehicles to efficiently connect with scheduled vehicles in regard to scheduling riders, according to some embodiments of the present disclosure. FIG. 2B shows an example of a CV assigning system, where the late riders/users/passengers 251A, 252A, 253A provide input to a system (see FIG. 3A) requesting the origin station, destination building and the time-window for arrival at the destination, at a time prior to their intended travel, i.e. after the ERs have been scheduled. As an example, late riders/users/passengers 251A, 252A, 253A communicate information 261 prior to travel, possibly just before they arrive at the originating train station. Wherein each user/passenger 251A, 252A, 253A using their individual smart-phones or computers 251B, 252B, 253B to communicate to the system (see FIG. 3A). The system (see FIG. 3A) determines the CV schedule for the known users 251A, 252A, 253A and the commuter vehicles 270A, 270B.

In regard to user/passenger, there may be two types, as noted above the early riders (ERs)/known passengers, and a second type can be late riders (LRs)/unknown passengers. The ERs reveal their travel itinerary in time before traveling the MTN which allows the MTN to schedule the ERs. These late riders (LRs)/uncertain passengers place a request in time for transportation scheduling with the MTN, after the known passenger's in time have provided their travel itinerary. For example, the LRs may submit their travel itinerary close in time before traveling, i.e. well after the ERs have already placed in time their request for their transportation scheduling. In order to make the schedule flexible enough to accommodate LRs at a later point, a set of scenarios containing each a set of Forecast LRs (FLRs) is generated before scheduling ERs, wherein each scenario represents a plausible realization of LRs and the FLRs of each scenario can fit in the schedule of ERs.

Still referring to FIG. 2A, the system (see FIG. 3A) communicates the optimal schedule for all early riders (ERs) 201A, 202A, 203A through the preferred communication device, such as a smartphone (wireless communication device), tablet or computer 201B, 202B, 203B. Wherein, the ERs 201A, 202A, 203A receives information 213 on the train time on which the ER leaves station of origin, the identification of the CV that the user travels on, and the start and arrival times for the journey in the commuter vehicle. Still referring to FIG. 2B, the system (see FIG. 3A) communicates the schedule for all late riders (LRs) 251A, 252A, 253A through the preferred communication device, such as a smartphone (wireless communication device), tablet or computer 251B, 252B, 253B. Wherein, the LRs 251A, 252A, 253A receives information 263 on the train time on which the ER leaves station of origin, the identification of the CV that the user travels on, and the start and arrival times for the journey in the commuter vehicle.

Figure 3A:
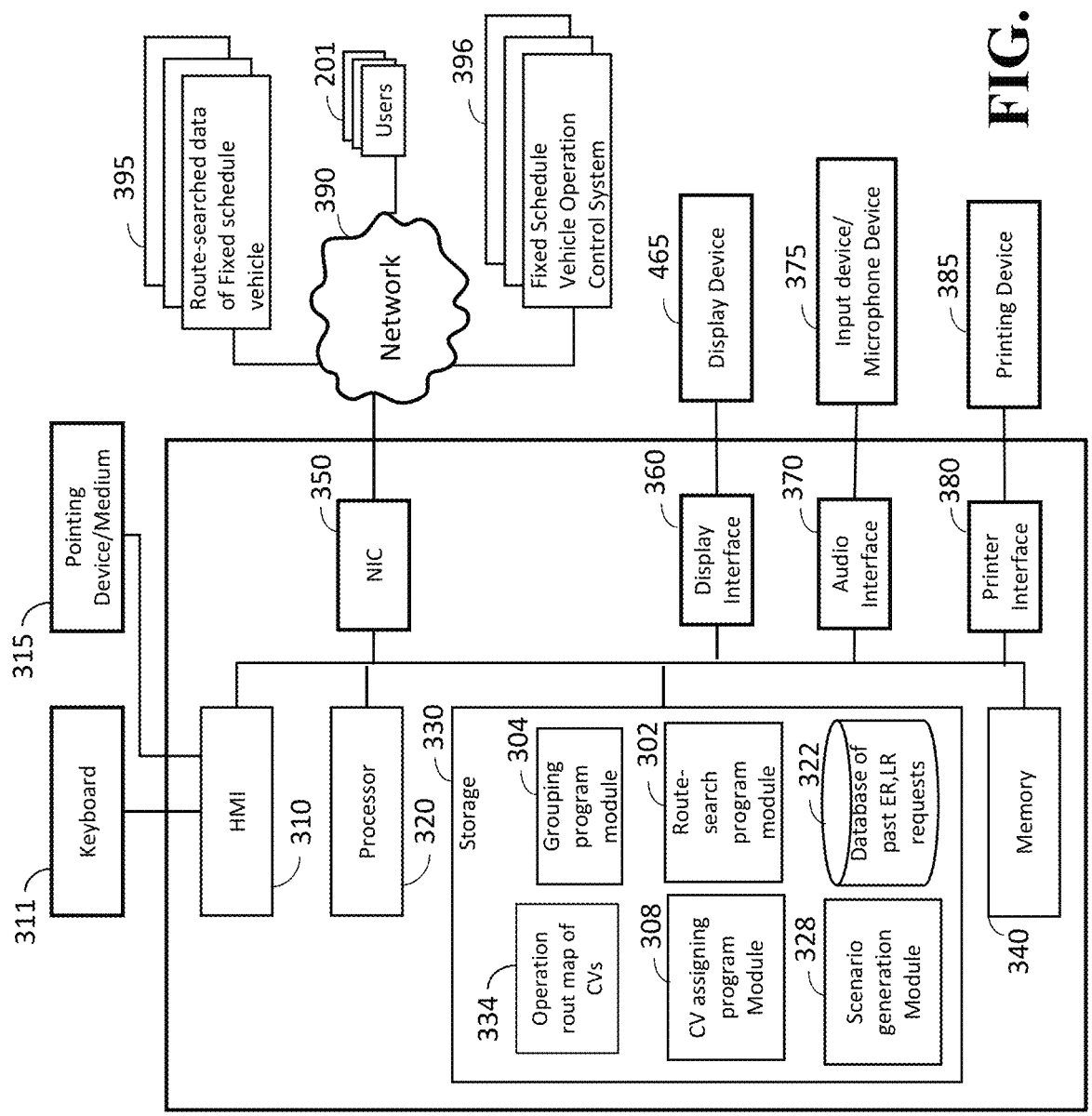
FIG. 3A shows a block diagram of a system, including a commuter vehicle assigning system, that can be utilized for scheduling the multiple modes of transportation and passengers, according to some embodiments of the present disclosure.

FIG. 3A shows a block diagram of a system, including a commuter vehicle assigning system, that can be utilized for scheduling the multiple modes of transportation and passengers, according to some embodiments of the present disclosure. The system 300 may include a human machine interface (HMI) 310 connectable with a keyboard 311 and a pointing device/medium 312, one or more processor 320, a storage device 330, a memory 340, a network interface controller 350 (NIC) connectable with a network 390 including local area networks and internet network, a display interface 360, an audio interface 370 connectable with a microphone device 375, a printer interface 380 connectable with a printing device 385. The memory 340 may be one or more memory units, operating with the storage 330 that stores computer executable programs (algorithm codes) in connection with the processor 320.

The commuter vehicle (CV) assigning system 300 may receive itinerary request data (not shown) from passengers (users), route-searched data of fixed schedule vehicles from public database or search results of public-opened route-search applications 395 via the network 390 connected to the NIC 350. The NIC 350 includes a receiver and transmitter to connect to the network 390 via wired-networks and via wireless-networks (not shown). In some cases, the itinerary request data may include ERs and LRs preferred options having conditions, such as a lowest fare, a shortest travel time, or a shortest travel distance. When the system 300 receives the ERs preferred options, the CV assigning system 300 performs the grouping program module 304 and the CV assigning program module 308 based on the conditions of the preferred option. For instance, when the preferred option indicates the lowest fare, the CV assigning system 300 generates an itinerary schedule providing an intermediate location (station) and the start time of a CV from the intermediate location, in which the itinerary schedule satisfies the condition of the lowest (minimum) total fare to be paid by the passenger to transport from the initial location to the target location.

Still referring to FIG. 3A, the system 300 can provide information of the commuter vehicles 220A, 220B of FIG. 2, the start time of the trips, the routes that the commuter vehicles take, and the information on the passengers that are transported in those trips.

In some cases, if the passenger possesses a commuter pass available between the initial location and a station (near-station) that is one stop near than the intermediate location from the initial location, the system 300 sets the near-station as the intermediate location such that the total fare of each passenger between the initial location to the target location can be less expensive. In such cases, the system 300 is configured to request the information of the passengers' commuter passes, e.g. available stations of the commuter pass.

Still referring to FIG. 3A, the system 300 can communicate with a fixed schedule vehicle operation control system 396 via the network 390. For instance, when the fixed schedule vehicle operation control system 396 obtains information on the latest changed schedules of the fixed schedule vehicles on-time, the interface 350 can receive the information of the changed schedules relevant to already assigned or to be assigned CV schedule, and the system 300 re-performs the grouping and CV assigning programs to obtain and transmit another assignment information to the passengers. Accordingly, the passengers can obtain reasonable CV assignment even if the schedule of the fixed schedule vehicles changed after the initial assignment information is transmitted to the passengers. This provides extremely effective seamless transportation for the passengers.

In some cases, the system 300 can receive the information regarding the current operation status of the scheduled vehicles from the fixed schedule vehicle operation control system 396 via the network 390 before assigning the scheduled vehicles to the passengers. For instance, while rush hours of day, the fixed schedule vehicle operation control system 396 provides the system 300 with an estimated passenger distribution (crowded condition) on each fixed schedule vehicle as a function of time hours of day. In other words, the fixed schedule vehicle operation control system 396 includes statistic data that can provide an estimated energy consumption of each of the fixed schedule vehicles operated in different time schedules in day for their operation sections. For instance, when a fixed schedule vehicle is operated in a crowded operation section during a rush hour, the energy consumption of the fixed schedule vehicle is greater than that operated in a non-rush hour for a non-crowded operation section. Accordingly, the fixed schedule vehicle operation control system 396 can provide information how much the energy consumption is reduced with another arrival time to the intermediate location (e.g. station) if the passengers shift the initially assigned start time to another start time or/and another route.

Still referring to FIG. 3A, according to an embodiment of the present disclosure, the system 300 can generate information as to how much the energy consumption can be reduced if the passenger changes the assigned start time and the route to other start times and other routes, and can transmit the information to the passenger. This is a quite beneficial to reduce the total energy consumed by the fixed schedule vehicles, and can be a great environment-friendly system. Further, the fixed schedule vehicle operation control system 396 may include a rush-hour related dynamic pricing system. In this case, by communicating with the fixed schedule vehicle operation control system 396, the system 300 can generate information as to how much a fare of the fixed scheduled vehicle can be reduced and transmit the information to the passenger, in which the reduction of the fare is associated to the reduction of the energy consumption of the fixed vehicle according to a predetermined calculation method included the fixed schedule vehicle operation control system 396. This can be a great incentive for the passenger to choose an environment-friendly travel schedule which is transmitted from the system 300.

Further, the interface receives information on traffic conditions including traffic jams, traffic accidents and constructions on the operation route map via the network and the route-search program searches the routes of the groups so as to avoid the traffic conditions. This feature is a great beneficial for reducing the travel times of the passengers and the energy consumption of the CVs.

Still referring to FIG. 3A, the scheduling of the passengers on the fixed schedule vehicles also reveals the extent of crowding on fixed schedule vehicles and the fixed schedule vehicles trips on which the crowding occurs. The crowding on fixed schedule vehicles leads to poor service quality as passengers feel claustrophobic and fatigued. Hence, the information on crowding is of significant value to the fixed schedule vehicle operators. Using such information, the fixed schedule operators can target specific customers that contribute to the crowding and offer financial incentives or disincentives as appropriate. For instance, the fixed schedule operator can charge higher fares to disincentive the travel at particular times or offer discounted fares if the passenger offers to travel at a later time. Thus, the fixed schedule operator can interact with the passengers to influence their times of travel in order to provide them with a better quality of service. The storage device 330 includes a grouping program module 304, a route-search program module 302, a commuter vehicle assigning program module 308, and CV operation route map database 334 (operation route map program). The pointing device/medium 312 may include modules that read programs stored on a computer readable recording medium. The CV operation route map database 334 includes roadmap data of the CV operation areas, which are used to compute (calculates) routes of the CVs in response to the itinerary requests.

Still referring to FIG. 3A, for performing the program modules 302, 304 and 308, instructions may be transmitted to the system 300 using the keyboard 311, the pointing device/medium 312 or via the network 390 connected to other computers (not shown). The system 300 receives instructions via the HMI 310 and executes the instructions for performing CV assignments to the passengers using the processor 320 in connection with the memory 340, the grouping program module 304, the route-search program module 302, and the commuter vehicle assigning program module 308 stored in the storage device 330.

According to embodiments of the present disclosure, the system 300 is used for assigning commuter vehicles (CVs) in a multi-modal transportation network having the CVs and fixed schedule vehicles to passengers. The system 300 may include an interface 350 to receive itinerary requests from the passengers (users) 201, wherein the itinerary requests may include initial locations, target locations, departure times from the initial locations, and arrival time windows including deadlines at the target locations. Further the system 300 includes a memory (or/and storage) to store computer executable programs including a grouping program, a route-search program, an operation route map program of the CVs, and a commuter assigning program, and a processor 320 to perform the computer executable programs in connection with the memory. The grouping program includes steps formulating an optimization problem to determine groups of passengers based on the target locations of the passengers and to determine the start times on the fixed schedule vehicles and CVs for the passengers; solving the optimization problem to generate a solution defining the groups of passengers and the start times on the fixed schedule and CVs for the passengers; storing the solution obtained from solving the optimization problem in the memory, wherein the formulating, solving and storing are repeated for obtaining solutions for a set of weighting factors and combinations of total travel times of the passengers and a number of groups; choosing a solution among the solutions obtained for linear combinations of the total travel times of the passengers and the number of groups; assigning the CVs to the groups and routes for the CVs by performing the commuter assigning program; generating assignment information of assigned CVs among the CVs based on the chosen solution, wherein the assignment information includes the assigned CVs to the groups, the routes assigned to the CVs, intermediate locations and start times of the assigned CVs from the intermediate locations; and transmitting the assignment information to the assigned CVs via the interface.

Still referring to FIG. 3A, in steps performed in the executable programs in the system 300, the optimization problem can be formulated to minimize a linear combination of a sum of the total travel times of all the passengers and the number of the groups, wherein the combination is performed using a weighting factor. In this case, the optimization problem includes constraints to ensure that passengers reach destination within the arrival time windows of the passengers and ensure that the number of passengers in the group is smaller than a number of seats in the CVs, wherein the route-search and operation route map programs provide respective travel times for the CVs, wherein the constraints ensure that the number of CVs operating simultaneously is smaller than a total number of available CVs stored in the memory. In this case, each of the passengers may be supposed to have a total travel time.

By performing the executable programs in the system 300, the computational time can be greatly reduced when compared to conventional scheduling methods, and then the computation power consumption can also be greatly reduced. The computational methods applied are a first combined use of two-stage stochastic scheduling optimization with decision diagram optimization, wherein two-stage stochastic scheduling optimization permits the flexibility to incorporate LRs through the provisioning for forecast LRs (FLRs) from each scenario, and wherein decision diagram optimization permits to solve a scheduling optimization problem in a reasonable amount of processing time.

Still referring to FIG. 3A, in the system 300, the groups are assigned the routes and the intermediate locations by performing the route-search program using the operation route map program of the CVs, wherein the routes respectively reach the target locations of the groups from the intermediate locations, wherein the groups are assigned the start times at the intermediate locations to allow the passengers of the groups to switch from the fixed vehicles to the CVs at the intermediate locations and reach the target locations within the arrival time windows.

Further, the passengers assigned to an identical group share an identical CV. This provides a simpler data processing method of the system, which allows a high speed grouping and travel scheduling method, resulting less computational power consumption.

Still referring to FIG. 3A, according to embodiments of the present disclosure, in the grouping discussed above, the grouping program may be performed by constructing and computing decision diagrams (DDs) for each of the target locations of the passengers, wherein each of the DDs is constructed based on a number of the passengers traveling to a common target location, the arrival time windows of the passengers and a seat capacity of each of the CVs.

The systems and methods of the present disclosure can greatly improve the calculation speed of the grouping process, providing less power consumptions of a computer system including a processor/processors. The possibilities of grouping provided by the DDs represent a limited set of all possible groupings, wherein it is mathematically proven that the groupings in the DDs suffice to generate an optimal schedule for metrics such as total and average travel time, total and average waiting time, total number of CV trips, or any weighted combination of the said metrics.

In some cases, the grouping program may sort the grouped passengers in ascending order of deadlines in the arrival time windows. This can provide a simpler method for grouping processes, and is extremely efficient when a number of passengers is increased.

Still referring to FIG. 3A, when an itinerary request of a passenger includes a preferred option that indicates a minimum total cost to be paid by the passenger, the passenger may be assigned to a group that satisfies another constrain for minimizing a sum of costs of a scheduled vehicle and an assigned CV. This can provide the passengers with a less fare travel schedule as the passengers' choice.

In some cases, the system 300 may communicate with the CVs so that the operation statuses of the CVs are monitored and updated by receiving a status information from each of the CVs via an information interface, wherein the operation statuses include locations of the CVs and a number of available seats of each of the CVs, wherein the updated operation statuses are stored into the memory. This makes the system 300 possible to ensure that the passengers can be appropriately assigned to the available seats of the CVs.

According to an embodiment, the memory 340 or/and storage 330 stores fares and time tables of the fixed schedule vehicles that stop at the intermediate locations. This can provide a flexible route with better traffic conditions.

Still referring to FIG. 3A, steps of the executable programs may comprise transmitting, via the interface, an itinerary to each of the passengers with a departure time of a fixed schedule vehicle accessible from an initial location, one of the intermediate locations and one of the assigned CVs so that each of the passengers reaches a corresponding intermediate location prior to the starting time of the one of the assigned CVs.

In some cases, the optimization problem may be formulated to minimize a linear combination of the total travel times and an energy to be consumed by the CVs, a total fare to be paid by each of the passengers, a linear combination of the total travel time and the total fare or a linear combination of the total travel time and an energy to be consumed by the fixed schedule vehicles. This provides the passengers less expensive services.

Further, when the itinerary includes the total fare, the optimization problem is solved to satisfy the total fare as one of the constraints. This provides the passengers more flexible choices for their travel schedules.

Still referring to FIG. 3A, in some cases, in order to perform time-effective computation cycles to obtain the solutions, the steps of grouping, assigning, ensuring and evaluating are repeated until a predetermined time limit is reached on the processor.

Further, the interface can receive information on traffic conditions including traffic jams, traffic accidents and constructions on the operation route map via the network and the route-search program searches the routes of the groups so as to avoid the traffic conditions. This provides the passengers better services (less time consuming to the target locations), also reduce the total energy (fuel) to be spent by the CVs, reducing the energy consumptions of the CVs.

Still referring to FIG. 3A, according to embodiments, the commuter assigning program solves the optimization problem based on one of constraints of the total travel time of the passengers, an energy used by the assigned CVs in transporting the passengers and a linear combination of the total travel time and the energy used in transporting the passengers. This can provide the passengers with flexible choices that allow less-energy consumption operations of the CVs.

Further, the system can transmit each passenger information as to how much a fare of the fixed scheduled vehicle is reduced if the passenger chooses an environment-friendly travel schedule. This can provide the passengers with an economical incentive to contribute the environment-friendly travel. This is a great benefit regarding an environment-friendly operations of the fixed scheduled vehicles.

Figure 3B:
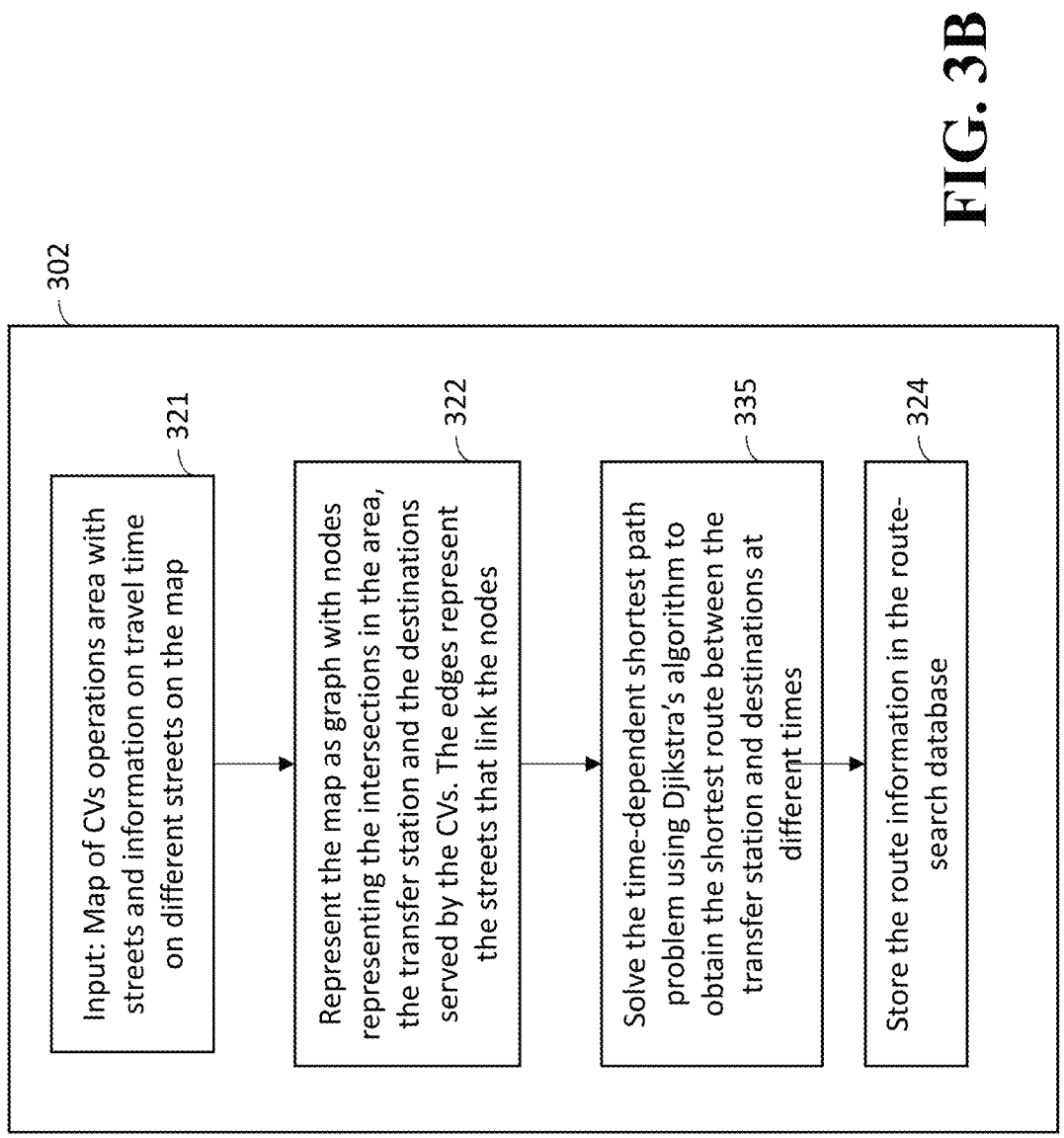
FIG. 3B shows a block diagram of a route search program according to some embodiments of the present disclosure.

FIG. 3B is an example illustrating a flowchart consisting of the elements of the route search program for the calculation of routes to be used by the commuter vehicles in reaching the requested passenger destinations, according to some embodiments of the present disclosure. For example, the route search program 302 has as in memory the map of the operation area of the CVs 321 which denote the streets on which the CVs can travel, the intersection between the streets and the time to travel on each of these streets at different times of the day. The information on the map is represented as a graph in step 322 where the nodes of the graphs are the intermediate station, street intersections and destinations and the edges in the graphs are the streets. Using the graph representation, the shortest paths between the intermediate station and destinations are computed in step 323 using the well-known Djisktra's algorithm at different times of travel from the transfer station and also the time to return is also computed in a similar manner. The information on such shortest time routes is stored in a database in step 324 for later use in the scheduling of passengers. Further, once a route is chosen or determined using the rout search program, a fare of the CV 321 is provided based on a CV fare calculation program (not shown) that calculates the fare of the CV 321 based on a distance of the determined route and an expected time to reach the target location from the corresponding intermediate location determined by the station of the fixed schedule vehicle.

In some cases, the system 300 may obtain the information on the shortest time routes from outside networks that provide the route information including the corresponding distance. The outside networks can be operated by third parties.

Figure 4:
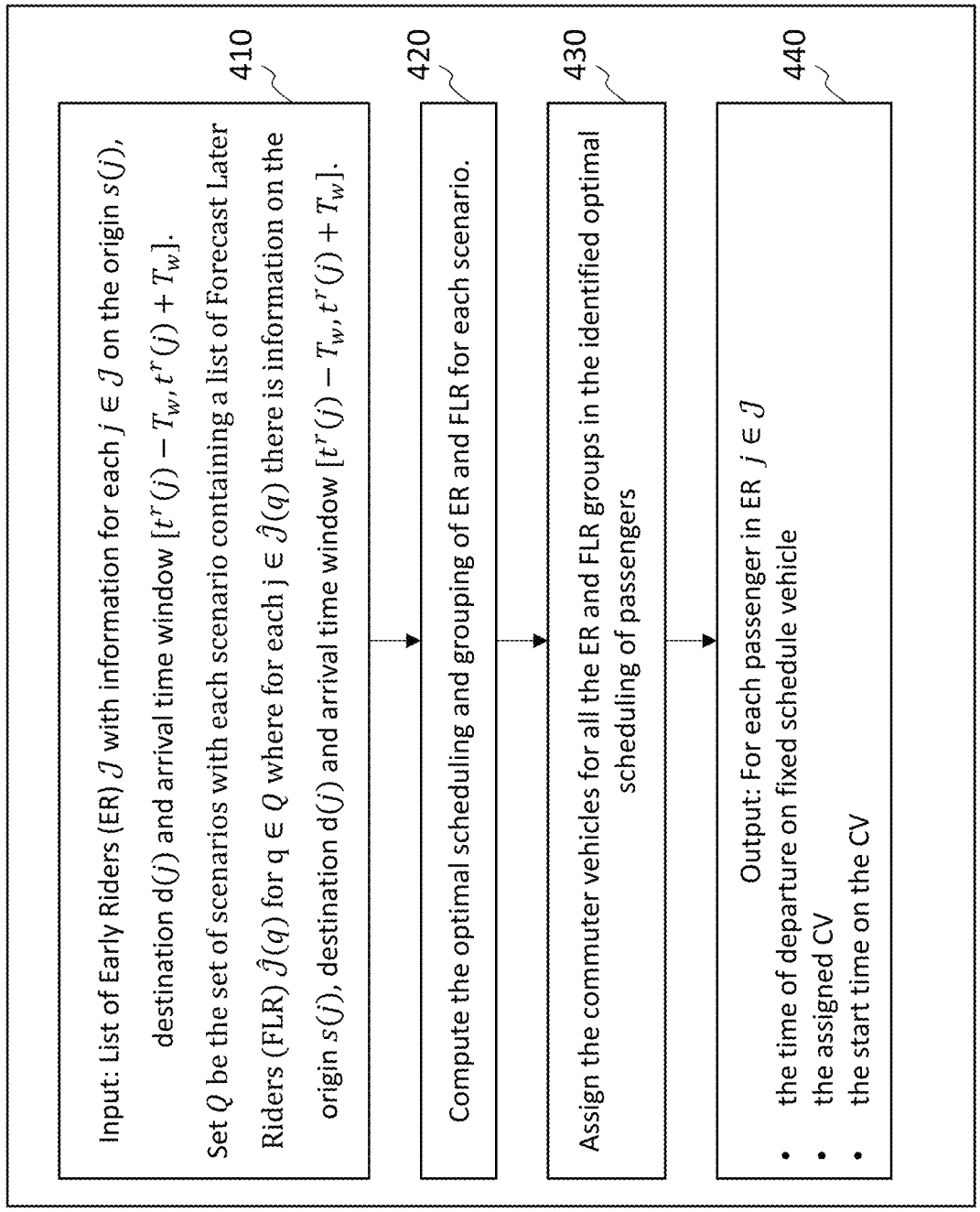
FIG. 4 is a flowchart illustrating primary steps for scheduling passengers jointly on fixed schedule vehicles and commuter vehicles, according to some embodiments of the present disclosure.

FIG. 4 is a flowchart illustrating a primary procedure 400 for scheduling passengers on the multiple modes of transportation, according to some embodiments of the present disclosure. The procedure 400 performs an input step 410 where input data include the information on each Early Rider (ER) passenger $j \in \mathcal{J}$ on the origin s(j), destination d(j) and arrival time window $[t^r(j)-T_w, t^r(j)+T_w]$. Also, provided as input are $\mathcal{Q}$ a finite set of scenarios representing different realizations of the Late Rider (LR) passengers with $\hat{\mathcal{J}}(q)$ being the set of Forecast Late Rider (FLR) passengers in scenario $q \in \mathcal{Q}$. Each FLR passenger $j \in \hat{\mathcal{J}}(q)$ requests transport from a station $s(j) \in S$ to $T_0$, and then by CV to destination $d(j) \in \mathcal{D}$, to arrive at time $t^r(j)$ and the arrival time window $[t^r(j)-T_w, t^r(j)+T_w]$. The set of FLR passengers that request service to destination d is denoted by $\hat{\mathcal{J}}(q,d)$. Let $\hat{n}_q := |\hat{\mathcal{J}}(q)|$ and $\hat{n}_{q,d} := |\hat{\mathcal{J}}(q,d)|$. Using this information, the procedure 400 computes an optimal scheduling and grouping of the ER and FLR passengers in step 420 to minimize an objective such as the linear combination of total travel time of passengers and the number of CV trips. The computed solution is then used to identify the assignment of the commuter vehicles to the ER and FLR passengers in step 430. Finally, the assigned fixed schedule vehicle, start time and assigned commuter vehicle information is communicated to the ER passengers in step 440.

Embodiments of the present disclosure use a two-stage stochastic programming formulation for the integrated last-mile transportation problem (ILMTP) under additional passenger uncertainty (ILMTP-APU). Assumed is that passenger requests consist of a set of known passengers/early riders (ERs) and uncertain passengers/late riders (LRs). The LRs are modeled through a finite set of scenarios are called the Forecast Late Riders (FLRs). The first-stage decision is the scheduling of ERs and the second-stage schedules the FLRs from a finite set of scenarios. At least one approach relies on decision-diagram (DD)-based optimization (DDO), and more specifically on decompositions based on DDs. Specifically, a DD model is built for ERs going to each building and separately for FLRs in each scenario and for each building. The DDs are then integrated through channeling constraints that can be optimized over through an integer programming (IP) formulation. This results in a large model. However, due to the tightness of the formulation, we obtain a reliable approach for optimally solving the problem. The resulting solutions are significantly better than what could be obtained by solving the problem for the known passengers to optimality and then scheduling the unknown passengers with the remaining capacity when a scenario is realized.

Some embodiments of the present disclosure utilize a model that includes both the first-state and second-stage decisions using DDs and link them through assignment constraints. Wherein this allows for an additional mechanism by which decision making under uncertainty can be addressed.

Problem Description

Initially, the elements of the problem are described, the elements include the mass transit system, last-mile vehicles, destinations, passenger requests, and associated parameters.

Mass Transit System:

For the sake of convenience, assumed is that the mass transit is a train system, by non-limiting example. Let $T_0$ be the terminal station that links a mass transit system with a last-mile service system. The mass transit system is described by a set of trips, denoted by C, with $n_C := |C|$. Each trip originates at a station in set S and ends at $T_0$. The trips are regular in the sense that the train stops at all stations in S sequentially, with $T_0$ as the last stop of each trip. A trip c leaves station $s \in S$, at time $t^-(c, s)$, and arrives to $T_0$ at $t^-(c)$.

Destinations:

Let $\mathcal{D}$ be the set of destinations where the CVs make stops, with $K := |\mathcal{D}|$, where $T_0 \in \mathcal{D}$. For each destination $d \in \mathcal{D}$, let $\tau(d)$ be the total time it takes a CV to depart $T_0$, travel to d (denoted by $\tau_1(d)$), stop at d for passengers to disembark (denoted by $\tau^2(d)$), and return to $T_0$ (denoted by $\tau^3(d)$). Therefore, $\tau(d) = \tau^1(d) + \tau^2(d) + \tau^3(d)$. Let $\mathcal{T} := \{1, \ldots, t^{max}\}$ be an index set of the operation times of both systems. Assume that the time required to board passengers into the CVs is incorporated in $\tau^1(d)$. For simplicity, the boarding time is independent of the number of passengers.

Last-Mile System:

Let V be the set of CVs, with $m := |V|$. Denote by $v^{cap}$ the number of passengers that can be assigned to a single CV trip. Each CV trip consists of a set of passengers boarding the CV, traveling from $T_0$ to a destination $d \in \mathcal{D}$, and then returning back to $T_0$. Therefore, passengers sharing a common CV trip must request transportation to a common building. We also assume that each CV must be back at the terminal by time $t^{max}$.

Early Riders (ERs)/Known Passengers:

Let $\mathcal{J}$ be the set of known ER passengers. Each ER passenger $j \in \mathcal{J}$ requests transport from a station $s(j) \in S$ to $T_0$, and then by CV to destination $d(j) \in \mathcal{D}$, to arrive at time $t^r(j)$. The set of ER passengers that request service to destination d is denoted by $\mathcal{J}(d)$. Let $n := |\mathcal{J}|$ and $n_d := |\mathcal{J}(d)|$. Each ER passenger $j \in \mathcal{J}$ must arrive to d(j) between $t^r(j) - T_w$ and $t^r(j) + T_w$.

Forecast Late Riders (FLRs)/Forecast of Uncertain Passengers:

Let $\mathcal{Q}$ denote a finite set of scenarios representing different realizations of the uncertain LR passengers. Let $\hat{\mathcal{J}}(q)$ be the set of Forecast late Rider (FLR) passengers in scenario $q \in \mathcal{Q}$. Each FLR passenger $j \in \hat{\mathcal{J}}(q)$ requests transport from a station $s(j) \in S$ to $T_0$, and then by CV to destination $d(j) \in \mathcal{D}$, to arrive at time $t^r(j)$. The set of FLR passengers that request service to destination d is denoted by $\hat{\mathcal{J}}(q,d)$. Let $\hat{n}_q := |\hat{\mathcal{J}}(q)|$ and $\hat{n}_{q,d} := |\hat{\mathcal{J}}(q,d)|$.

Statement of the problem includes the integrated last-mile transportation problem (ILMTP) under additional passenger uncertainty (ILMTP-APU) is a problem of assigning train trips and CVs to each known ER passenger so that the FLR passengers in any of the scenarios Q can be feasibly scheduled and the expected value of a convex combination of the total transit time and the number of CV trips utilized is minimized. A solution can therefor consist of:

A partition $g = \{g_1, \ldots g_\gamma\}$ of $\mathcal{J}$, of ER passengers $\mathcal{J}$, with each group $g_l$ associated with a departure time $t_l^{g'}$, for $l = 1, \ldots, \gamma$, indicating the time the CV carrying the ER passengers in $g_l$ departs $T_0$, satisfying all request time and operational constraints. For any ER passenger $j \in \mathcal{J}$, let g(j) be the group in g that j belongs to.

For each $q \in \mathcal{Q}$, a partition $\hat{g}(q) = \{\hat{g}_{q,1}, \ldots, \hat{g}_{q,\hat{\gamma}(q)}\}$ of $\hat{\mathcal{J}}(q)$ (the FLR passengers from a scenario) with each group $\hat{g}_{q,k}$ associated with a departure time $t_k^{\hat{g}(q)}$, for $K = 1, \ldots, \hat{\gamma}(q)$ and an indicator function $\sigma(q,k) \in \{1, \ldots, \gamma\} \cup \{\emptyset\}$, $\sigma(q,k) \neq \emptyset$ indicates that forecast uncertain passenger group $\hat{g}_{q,k}$ shares the last mile trip with known ER passenger group $g_{\sigma(q,k)}$. In other words, groups leave from the terminal at the same time (i.e. $t_{\sigma(q,k)}^g = t_k^{\hat{g}(q)}$) and the combination of ER passenger group and all such shared FLR passenger groups in a scenario does not exceed the CV capacity, i.e. $|g_l| + \Sigma_{k \in \{1, \ldots, \hat{\gamma}(q): \sigma(q,k) = l\}} |\hat{g}_{q,k}| \leq v^{cap}$ for each $l \in \{1, \ldots, \gamma\}$ and $q \in \mathcal{Q}$.

Structure of Optimal Solutions

The deterministic version of ILMTP has optimal solutions with a structure that is particularly helpful for defining compact models. For each destination, passengers can be sorted by their desired arrival times and then grouped sequentially. This structure is valid to minimize passenger average waiting and travel times as well as the number of CV trips, hence leading to the compact DD-based model. For ILMTP-APU, however, a more elaborate structure is required.

For example, suppose that for a particular time range there is a single CV of capacity 4 available, 4 known ER passengers, and just 1 unknown LR passenger in 1 out of 10 scenarios. Furthermore, assume that a first trip with the CV incurs no wait time whereas a second trip would impose a wait time of w on any passenger involved, and that the desired arrival time of the uncertain passenger falls strictly in the middle of those of the known ER passengers. If the passengers are sorted and grouped regardless of their categories, then at least 2 trips will always be necessary and at least 1 known passenger has to wait w. But defining a second trip only for the unknown LR passenger, then results in the average cost of the solution is reduced to a tenth because the second trip and the corresponding wait time w only materialize in 1 out of 10 scenarios. Since uncertain LR passengers have a smaller impact on the objective function, it is intuitive that they might be delayed with respect to known passengers if the schedule remains feasible. This two-tier structure is formalized using the groups of ER passengers and forecast uncertain FLR passengers.

When ILMTP-APU is feasible, there is an optimal solution where the groups of passengers for each category, known (ER) or forecast (FLR) from a scenario, are grouped sequentially by their desired arrival times.

The following statement, which is independent from the previous statement, is also helpful to simplify the modeling of ILMTP-APU.

When ILMTP-APU is feasible, there is an optimal solution where at most one group of uncertain passengers (FLR) for each scenario is assigned to each group of known (ER) passengers.

Decision Diagram for Single Destination

A Decision Diagram (DD) is used to represent the ER groups for each destination. For each destination $d \in \mathcal{D}$, a decision diagram $D^d$ is constructed. The DD $D^d$ is a layered-acyclic directed graph $D^d = (N^d, A^d)$ where $N^d$ is the set of nodes in the DD and $A^d$ is the set of arcs in the DD. The set of nodes $N^d$ is partitioned into $(n_d+2)$ ordered layers $L_0^d, \ldots, L_{n_d+1}^d$ where $n_d = |\mathcal{T}(d)|$. Layer $L_0^d = \{r^d\}$ and $L_{n_d+1}^d = \{t^d\}$ consisting of one node each representing the root and terminal respectively. The layer of node $u \in L_i^d$ is defined as $\ell(u) = i$. Each arc $a \in A^d$ is directed from its arc-root $\psi(a)$ to its acr-terminal $\omega(a)$, with $\ell(\omega(a)) = \ell(\psi(a))+1$. The arc-layer of a is denoted as $\ell(a) := \psi(a)$. The layers $\{L_1^d, \ldots, L_{n_d}^d\}$ of the DD correspond to passengers $\{j_1, \ldots, j_{n_d}\}$ ordered in nondecreasing order of $t^r$ such that $t^r(j_k) \leq t^r(j_{k+1})$. Each node u is associated with a state $\delta(u)$ that denotes the number passengers already aboard the CV in the DD. The DD consists of two classes of cars: one-arcs and zero-arcs, indicated by $\phi(a) = 1, 0$ respectively. A one-arc stores an W(a) and an arc-start time $t^0(a)$ denoting the start time on the CV. The arc-cost of an arc corresponds to the total objective function incurred by a set of passengers, and the arc-start time indicates the time at which the passengers depart from T0 on a CV. A zero-arc does not have these attributes.

The DD $D^d$ for destination d represents every feasible partition of $\mathcal{T}(d)$ into groups of ER passengers that can board the CV based on the ordering of the passengers. The set $\mathcal{P}^d$ be the set of arc-specified $r^d$- to -$t^d$ paths in $D^d$. For any path $p \in \mathcal{P}^d$, the groups g(p) composing the partition defined by p are as follows. Every one-arc a in p corresponds to group $g(a) = \{j\ell_{(a)-\delta(\psi(a))}, j\ell_{(a)-\delta(\psi(a))+1}, \ldots, j\ell_{(a)}\}$, i.e., the set of contiguously indexed passengers ending in index l(a) of size $\delta(\psi(a))+1$. The partition defined by p is $g(p) := \cup_{a \in A^d: \phi(a)=1} g(a)$. The DDs are constructed such that for every arc-specified $r^d$- to -$t^d$ has exactly one occurrence of each passenger $j \in \mathcal{T}(d)$, i.e. $g(j) \in g(p)$ is unique.

Since the one-arcs also have start times on the CVs, the paths also dictate the time that each group $g \in g(p)$ departs T0. The time to(a) indicates the start time on the CV and hence, the CV continues to be in service for the time instants $t \in [t^0(a), t^0(a)+t(d, t^0(a))]$. The construction of the DD ensures that the arrival time to destination d is feasible for each group, i.e. $t^0(a)+t^1(d, t^0(a)) \in [t^r(j)-T_w, t^r(j)+T_w]$ for all $j \in g(a)$.

The objective function value on the arcs can be obtained as $$W(a) := \sum_{j \in g(a)} \left( t^0(a) + t^1(d(j), t^0(a)) - \max_{c \in C: \tilde{t}(c,T0) \leq t^0(a)} \tilde{t}(c, s(j)) \right) \quad (DD.1)$$

Define for each destination $d \in \mathcal{D}$, for each scenario $q \in \mathcal{Q}$, define a DD for FLR passengers from each scenario as $D^{d,q} = (N^{d,q}, A^{d,q})$ by using the corresponding upper index q for disambiguation. The set of nodes $N^{d,q}$ is partitioned into $(\hat{n}_{q,d}+2)$ ordered layers $L_0^{d,q}, \ldots, L_{\hat{n}_{q,d}+1}^{d,q}$ where $\hat{n}_{q,d} = |\mathcal{J}(q,d)|$. Layer $L_0^{d,q} = \{r^{d,q}\}$ and $L_{\hat{n}_{q,d}+1}^{d,q} = \{t^{d,q}\}$ consisting of one node each representing the root and terminal respectively. The layer of node $u \in L_i^{d,q}$ is defined as $\ell(u) = i$. Each arc $a \in A^{d,q}$ is directed from its arc-root $\psi(a)$ to its acr-terminal $\omega(a)$, with $l(\omega(a)) = l(\psi(a))+1$. The arc-layer of a is denoted as $l(a) := \psi(a)$. The layers $\{L_1^{d,q}, \ldots, L_{\hat{n}_{q,d}}^{d,q}\}$ of the DD correspond to passengers $\{j_1, \ldots, j_{\hat{n}_{q,d}}\}$ ordered in nondecreasing order of $t^r$ such that $t^r(j_k) \leq t^r(j_{k+1})$. Each node u is associated with a state $\delta(u)$ that denotes the number passengers already aboard the CV in the DD. The DD consists of two classes of cars: one-arcs and zero-arcs, indicated by $\phi(a) = 1, 0$ respectively. A one-arc stores an W(a) and an arc-start time to(a) denoting the start time on the CV. The arc-cost of an arc corresponds to the total objective function incurred by a set of passengers, and the arc-start time indicates the time at which the passengers depart from T0 on a CV. A zero-arc does not have these attributes.

The DD $D^{d,q}$ for destination d for each scenario q represents every feasible partition of $\mathcal{T}(q, d)$ into groups of passengers that can board the CV based on the ordering of the passengers. The set $\mathcal{P}^{d,q}$ be the set of arc-specified $r^{d,q}$- to -$t^{d,q}$ paths in $D^{d,q}$. For any path $p \in \mathcal{P}^{d,q}$, the groups g(p) composing the partition defined by p are as follows. Every one-arc a in p corresponds to group $g(a) = \{j\ell_{(a)-\delta(\psi(a))}, j\ell_{(a)-\delta(\psi(a))+1}, \ldots, j\ell_{(a)}\}$, i.e., the set of contiguously indexed passengers ending in index l(a) of size $\delta(\psi(a))+1$. The partition defined by p is $g(p) := \cup_{a \in A^d: \phi(a)=1} g(a)$. The DDs are constructed such that for every arc-specified $r^{d,q}$- to -$t^{d,q}$ has exactly one occurrence of each passenger $j \in \mathcal{J}(q, d)$, i.e. $g(j) \in g(p)$ is unique. Since the one-arcs also have start times on the CVs, the paths also dictate the time that each group $g \in g(p)$ departs T0. The time $t^0(a)$ indicates the start time on the CV and hence, the CV continues to be in service for the time instants $t \in [t^0(a), t^0(a)+t(d, t^0(a))]$. The construction of the DD ensures that the arrival time to destination d is feasible for each group, i.e. $t^0(a)+t^1(d, t^0(a)) \in [t^r(j)-T_w, t^r(j)+T_w]$ for all $j \in g(a)$. The objective function on the arc W(a) are computed as defined in Eq. (DD.1).

The arcs between layers of the diagram correspond to the passengers that request transportation to the destination.

Each node u is associated with a state s(u) corresponding to the number of immediately preceding passengers that is grouped with the next passenger. Each arc a is associated with a label $\varphi(a) \in \{0,1\}$ on whether passenger $\psi(a)$ is not the last one in the group, in which case $\varphi(a)=0$ and $s(\omega(a))=s(\psi(a))+1 \leq v^{cap}$, or else $\varphi(a)=1$. There can be multiple arcs between the same nodes in the latter case, each arc a corresponding to a different CV start time $t_0(a)$. Accordingly, each arc a such that $\varphi(a)=1$ has a corresponding wait time W(a) for all passengers in the group and a label $\chi(a,t) \in \{0,1\}$ to indicate that a CV would be active at time t (i.e. $t^0(a) \leq t \leq t^0(a)+\tau(d)$) if arc a is chosen. Hence, $\varphi(a)=0$ implies $\chi(a,t)=0$.

Integer Programming Formulation

Define a formulation by which the passengers are grouped using a path from each DD. Some of the groups of known and uncertain passengers are combined, and aim for a feasible schedule of the resulting groups using the CV fleet.

Introduce binary variable $x_a \in \{0,1\}$ $\forall a \in A^d$, $d \in \mathcal{D}$ D, to denote the choice of the particular arc in the DD for known passengers. Similarly, we introduce binary variable $y^q_a \in \{0,1\}$ $\forall a \in A^{d,q}$, $d \in \mathcal{D}$ to denote the choice of the particular arc in the DD for uncertain passengers in scenario $q \in Q$. Let $\tilde{A}^{d,q} = \{(a_1, a_2) \in A^d \times A^{d,q} | \varphi(a_1)=1, \varphi(a_2)=1, t^0(a_1)=t^0(a_2)$ and $s(\psi(a_1))+s(\psi(a_2))+2 \leq v^{cap}\}$. The set $\tilde{A}^{d,q}$ denotes the set of feasible pairs of known passenger group and uncertain passenger group of scenario q, i.e. identical start time on the CV and the capacity constraint is satisfied. Let $z^q_{a_1,a_2} \in \{0,1\} \forall (a_1, a_2) \in \tilde{A}^{d,q}$, denote the decision of pairing the group of known passengers represented by arc $a_1$ and group of uncertain passengers represented by arc $a_2$.

The objective function can be expressed as $$f(\alpha) = \sum_{d \in \mathcal{D}} \sum_{a \in A^d} [\alpha W(a) + (1-\alpha)] x_a +$$

$$\frac{1}{|Q|} \sum_{d \in \mathcal{D}} \sum_{q \in \mathcal{Q}} \left( \sum_{a \in A^{d,q}} [\alpha W(a) + (1-\alpha)] y^q_a - (1-\alpha) \sum_{(a_1,a_2) \in \tilde{A}^{d,q}} z^q_{a_1,a_2} \right)$$

(OBJ)

The following constraint imposes that only one group of uncertain passengers is paired with a group of known passengers if the latter is selected:

$$\sum_{a_2:(a_1,a_2) \in \tilde{A}^{d,q}} z^q_{a_1,a_2} \leq y_{a_1} \ \forall \ d \in \mathcal{D}, q \in \mathcal{Q}, a_1 \in A^d: \phi(a_1)=1. \quad (1a)$$

The fleet size constraint can be modeled for all $t \in T$, $q \in Q$ as $$\sum_{d \in \mathcal{D}} \left( \sum_{a \in A^d: \chi(a,t)=1} x_a + \sum_{a \in A^{d,q}: \chi(a,t)=1} y^q_a \right) - \sum_{d \in \mathcal{D}} \sum_{(a_1,a_2) \in \tilde{A}^{d,q}} z^q_{a_1,a_2} \leq m. \quad (1b)$$

The IP model for the ILMTP-APU is min $f(\alpha)$ s.t. Network flow constraints $D^d$ $\forall d \in \mathcal{D}$ (2a)

Network flow constraints for $D^{d,q}$ $\forall d \in D, q \in \mathcal{Q}$ (1b)

Eq. (1a), (1b)

$x_a \in \{0,1\}$ $\forall d \in D, a \in A^d$ (2c)

$y^q_a \in \{0,1\}$ $\forall d \in D, q \in \mathcal{Q}, a \in A^d$ (2d)

$z^q_{a_1,a_2} \in \{0,1\}$ $\forall d \in D, q \in \mathcal{Q}, (a_1,a_2) \in \tilde{A}^{d,q}$. (2e)

The network flow constraints in (2a)-(2b) guarantee that a path is taken on each decision diagram, which corresponds to the groupings of known ER passengers and FLR passengers for each scenario.

FIG. 5 a schematic of another example algorithm 500 to implement the step 420 of FIG. 4, according to embodiments of the present disclosure. The algorithm 500 is illustrated using a flowchart of the steps involved in the optimal scheduling of the passengers using the network flow formulation. The procedure first separates the ER passengeres and FLR passengers for each scenario by destination 510. For each such destination a decision diagram is constructed 520 for the ER passengers and FLR passengers for each scenario. The decision variables for the optimization problem are defined 530. The objective function Eq. (OBJ) is formulated 540 and the constraints are defined 540. The optimization problem is solved 560 to obtain the optimal solution. The solution is used to define the passenger groupings 570. Further, the algorithm also defines a function $G^q$ which identifies for each FLR group g in each scenario a corresponding ER $G^q(g)$ group that ride in the commuter vehicle with FLR group g 570. If the LR group g in a scenario does not share the commuter vehicle with the ER group then $G^q(g)=\emptyset$. The algorithm also assigns the start time on the commuter vehicle and the fixed schedule trip time for each ER passenger and FLR passenger from each scenario 580.

Figure 6A:
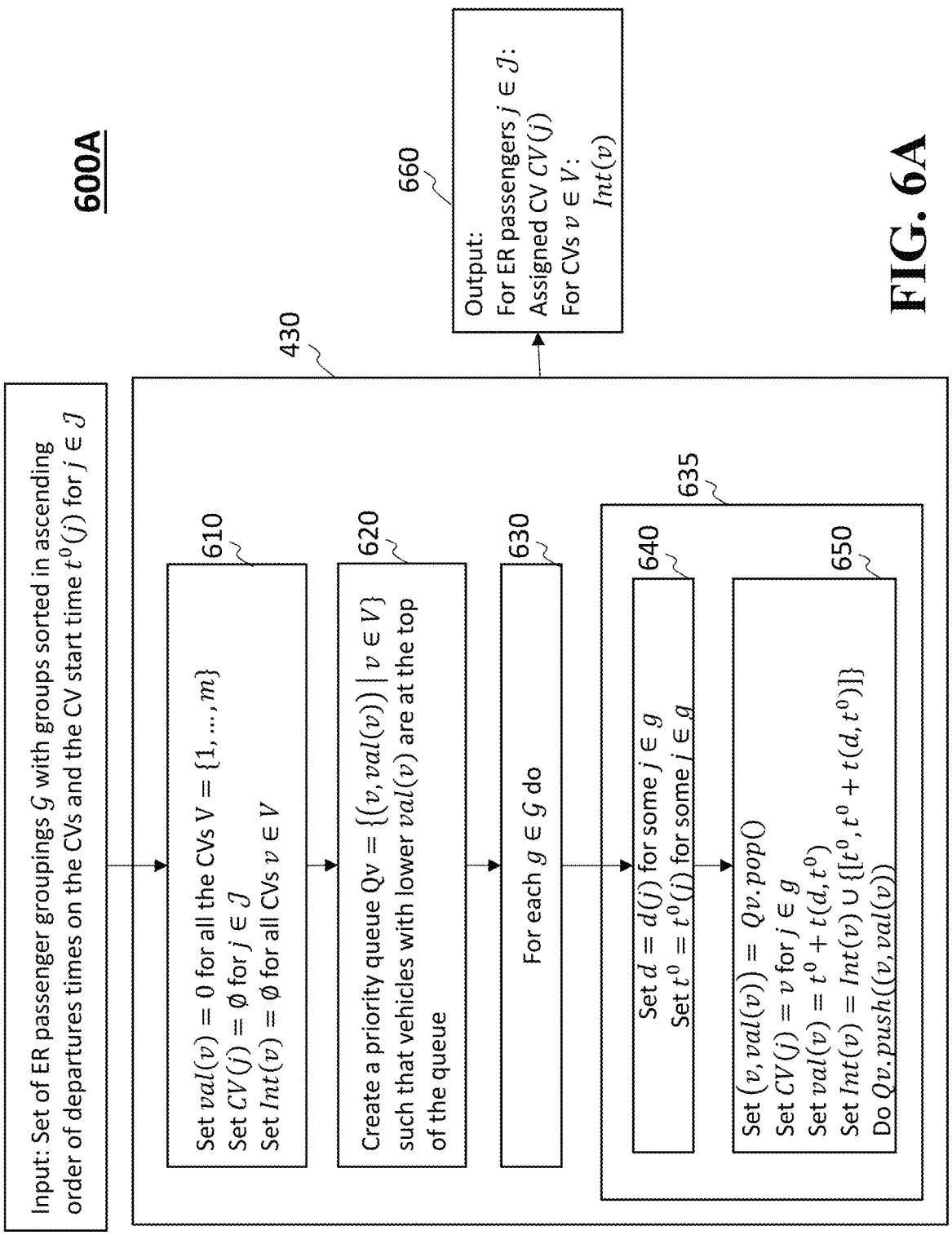
FIGS. 6A and 6B is a flowchart illustrating the assignment of commuter vehicles to Early Riders (ERs) and Forecast Later Riders (FLRs) passengers using the output of the network flow formulation, according to some embodiments of the present disclosure.

FIG. 6A is a schematic of another example algorithm 600A to implement the step 430 of FIG. 4, according to embodiments of the present disclosure. The algorithm 600A provides the assignment of commuter vehicles to ER passengers based on the set of passenger groupings and commuter vehicle start times obtained from solving the network flow formulation. The algorithm 600A proceeds by assigning to each commuter vehicle a label val(v)=0 and set of time intervals at which the vehicle is in operation Int(v)=∅ for all the CVs V={1, ..., m} 610. Using these labels a priority queue Qv={(v, val(v))|v∈V} is created such that the vehicles with lower val(v) are at the top of the queue 620. A loop is executed for each group $g \in \mathcal{G}$ 630, the destination and start time for the CV is picked according to that for group 640. The algorithm 600A chooses the vehicle at the top of the queue 650, the passengers in the group g are assigned to the CV v 650, the value of the label val(v) is increased 650, the set of time intervals Int(v) for which the CV v is in operation is updated 560, and the CV v is pushed into the queue 650. The algorithm 600A outputs the set of commuter vehicles for all the ER passengers and the set of time of intervals Int(v) for each CV v at which the vehicles are in operation.

Figure 6B:
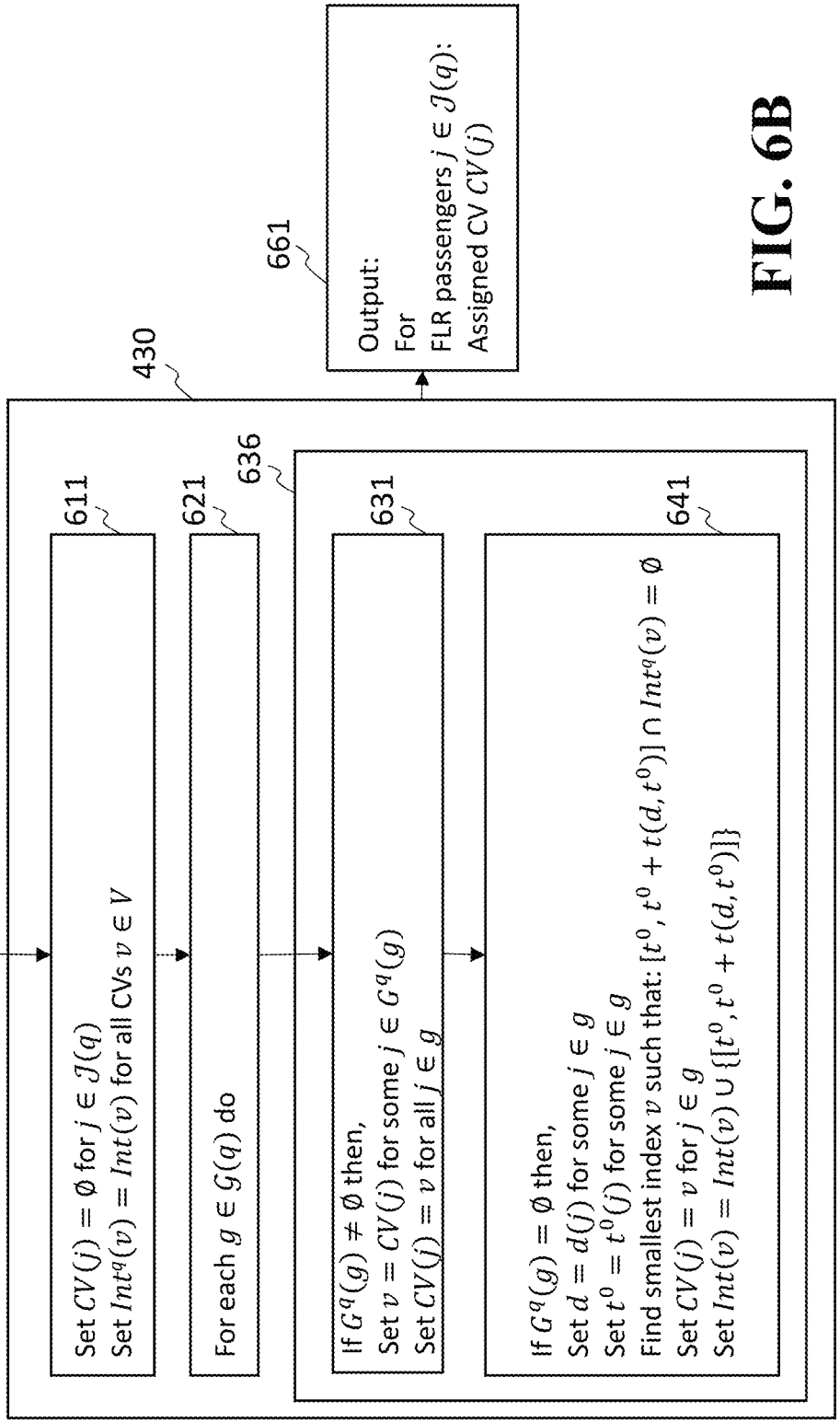

FIG. 6B is a schematic of another example algorithm 600B to implement the step 430 of FIG. 4, according to embodiments of the present disclosure. The algorithm 600B provides the assignment of commuter vehicles to FLR passengers for a scenario q E Q based on the set of FLR passenger groupings for that scenario, commuter vehicle start times obtained from solving the network flow formulation, the assigned ER that possibly accompanies the FLR group in the commuter vehicle obtained from solving the network flow formulation 570 and the assignment of commuter vehicles to ER passengers obtained from the algorithm 600A in FIG. 6A. The algorithm 600B proceeds by assigning to each commuter set of time intervals for that scenario at which the vehicle is in operation $Int^q(v)=Int(v)$ for all the CVs $V=\{1, \ldots, m\}$ 611. A loop is executed for each group $g \in \mathcal{G}(q)$ 621. If the FLR group g accompanies an ER group $G^q(g)$ then the commuter vehicle assigned to the passengers in the ER group $G^q(g)$ is also assigned to the FLR group g 631. If the FLR group g does not share a commuter vehicle with an ER group then the the destination and start time for the CV is picked according to that for group 641. The commuter vehicle which is not in operation over the time interval required for servicing the group FLR group g is found 641. The commuter vehicle is assigned to the passengers in the FLR group g. The set of intervals over which the commuter vehicle is in operation in that scenario $Int^q(v)$ is updated using the time interval for servicing the FLR group g 641. The algorithm 600B outputs the assignment of commuter vehicles for all the LR passengers in the scenario $q \in Q$. The algorithm 600B is repeated for each scenario to obtain the commuter vehicle assignments for all the FLR groups.

Figure 7:
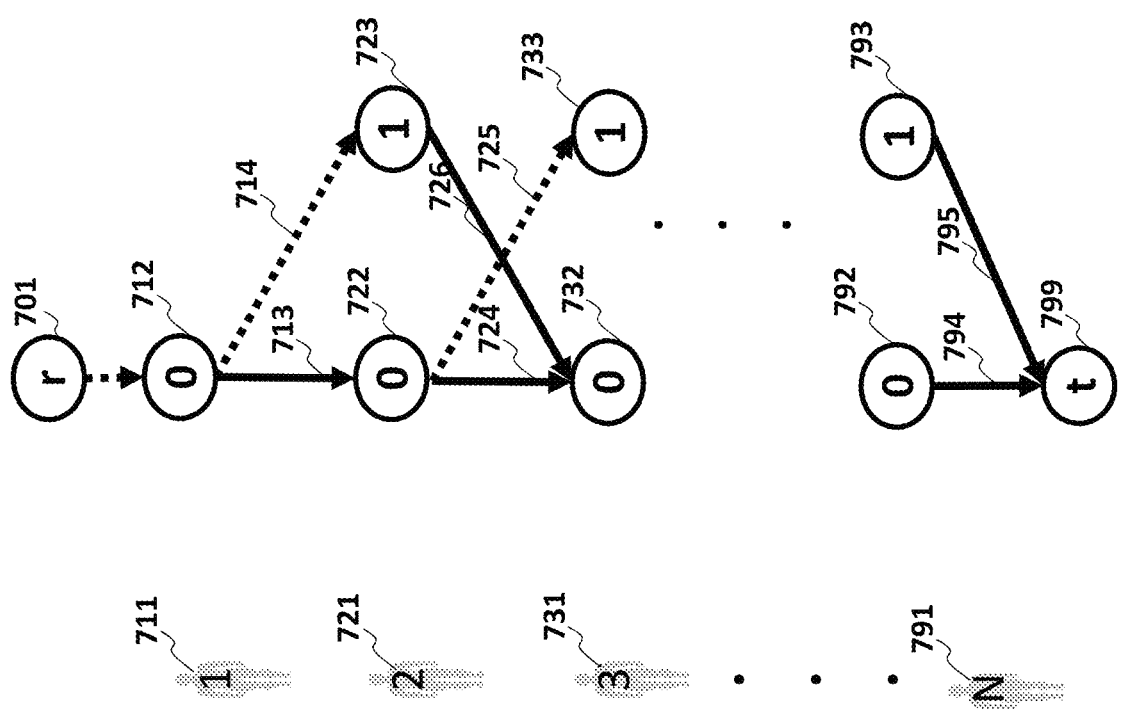
FIG. 7 is a schematic illustrating a decision diagram representation of groupings for a set of passengers that is sorted following a desired time of arrival, according to some embodiments of the present disclosure.

FIG. 7 is a schematic illustrating a decision diagram representation of groupings for a set of passengers that is sorted following a desired time of arrival, according to some embodiments of the present disclosure. The decision diagram with starting node (root) 701 depicts a sequence of decisions regarding how the successive passengers 1 (711), 2 (721), 3 (731) and N (791) are grouped. The decision diagram is depicted for the case of commuter vehicle with capacity two. For passenger 1 (711), node 712 denotes that there are 0 prior passengers grouped with passenger 1 (711), arc 713 groups passenger 1 (711) alone, arc 714 groups passenger 1 (711) with passenger 2 (721) and possibly other passengers. For passenger 2 (721), node 722 denotes that there are no prior passengers grouped with passenger 2 (721) due to arc 713 grouping prior passenger 1 (711) alone, node 723 denotes that there is one prior passenger grouped with passenger 2 (721) due to arc due to arc 714 grouping passenger 1 (711) with passenger 2 (721), arc 724 groups passenger 2 (721) alone, arc 725 groups passenger 2 (721) with passenger 3 (731) and possibly other passengers, arc 726 groups passenger 2 (721) with passenger 1 (711) only. For passenger 3 (731), node 732 denotes that there are no prior passengers grouped with passenger 3 (731) due either to arc 724 grouping prior passenger 2 (721) alone or to arc 726 grouping prior passengers 1 (711) and 2 (721) apart from passenger 3 (731), node 723 denotes that there is one prior passenger grouped with passenger 3 (731) due to arc due to arc 725 grouping passenger 2 (721) with passenger 3 (731). For passenger N (791), node 792 denotes that there are no prior passengers grouped with passenger N (791), node 793 denotes that there passenger N (791) is grouped with one prior passenger, arc 794 groups passenger N (791) alone, arc 795 groups passenger N (791) with one prior passenger. The decision diagram has an ending node (terminal) 799, wherein any grouping of passengers consist of a sequence of arcs leading from the root 701 to the terminal 799.

Figure 8:
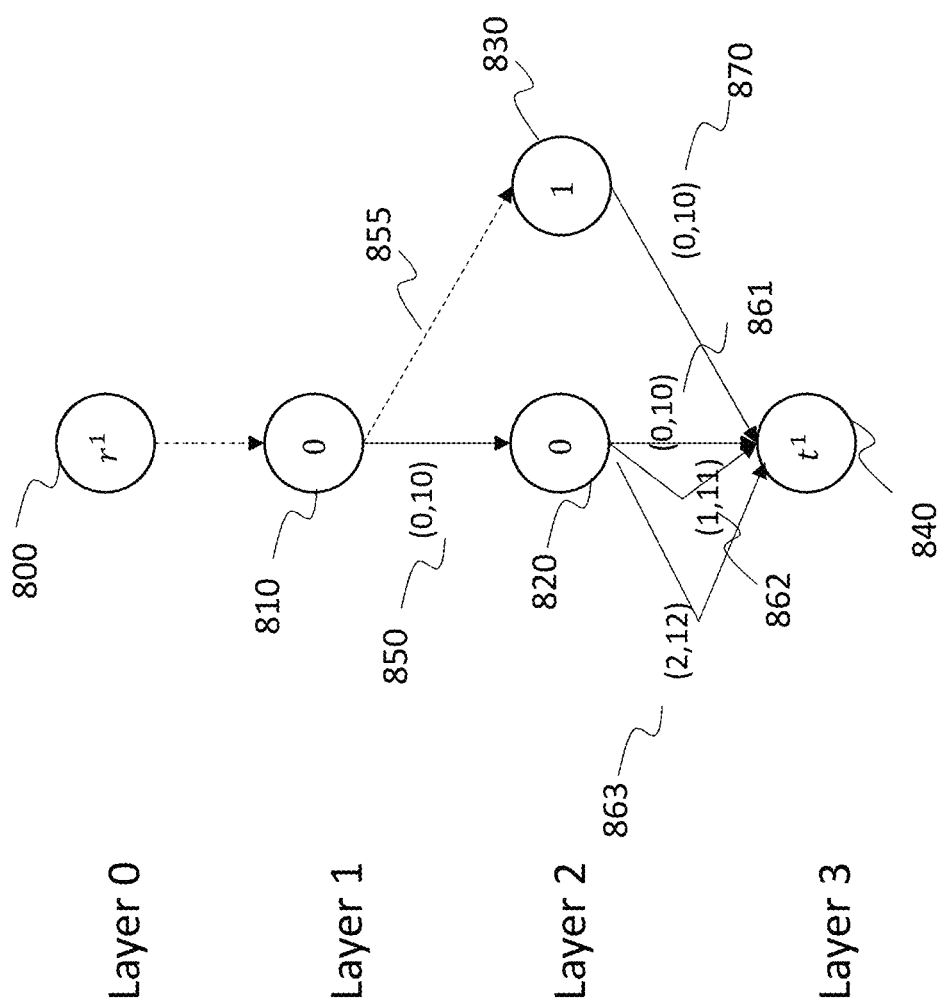
FIG. 8 is an example of the decision diagram representation of the groupings of passengers in the commuter vehicles, according to some embodiments of the present disclosure.

FIG. 8 is an example of the decision diagram representation of the groupings of passengers in the commuter vehicles, according to some embodiments of the present disclosure. Suppose there are two passengers requesting service to the same destination where the passengers request to arrive at their destinations in the time windows, origin stations are:

Passenger 1: arrival time window: [10,12], origin station: 1

Passenger 2: [12,14], origin station: 2.

Wherein the fixed schedule vehicles consist of two trips where the times of departure at the different stations are:

Trip 1: station 3: 4, station 2: 6, station 1: 8, T0: 10

Trip 2: station 3: 8, station 2: 10, station 1: 12, T0: 14.

The time to reach the destination on the commuter vehicles is 2 and the capacity of the commuter vehicles is 2. Passenger 1 can travel alone by arriving on Trip 1 and reaching the destination after traveling on commuter vehicle at 12. The wait time is 0 and only possible start time on commuter vehicle is 10. This denoted in the decision diagram by an arc 850 with label (0,10) denoting the wait time and start time on commuter vehicle. This arc is drawn from the 0-node of Layer 1 810 to 0-node of Layer 2 820 and is a one-arc. Passenger 2 can travel alone by arriving on Trip 1 and reaching the destination with possible start times on commuter vehicle 10, 11, 12. For these different start times the wait times are 0, 1, 2 respectively. Accordingly, 5 different arcs with labels: (0,10) 861, (1,11) 862, (2,12) 863 respectively. These arcs drawn between 0-node on Layer 2 and terminal-node of Layer 3 840. A 0-arc 855 is drawn between 0-node on Layer 2 to 1-node on Layer 3 indicating the joint travel of passengers 1 and 2 on the commuter vehicle. The two passengers can jointly travel on a commuter vehicle by arriving on Trip 1 and traveling on commuter vehicle starting at time 10. The total wait time for this group is 0 and this is indicated in the 1-arc joining 1-node on Layer 2 to terminal node on Layer 3.

Figure 9:
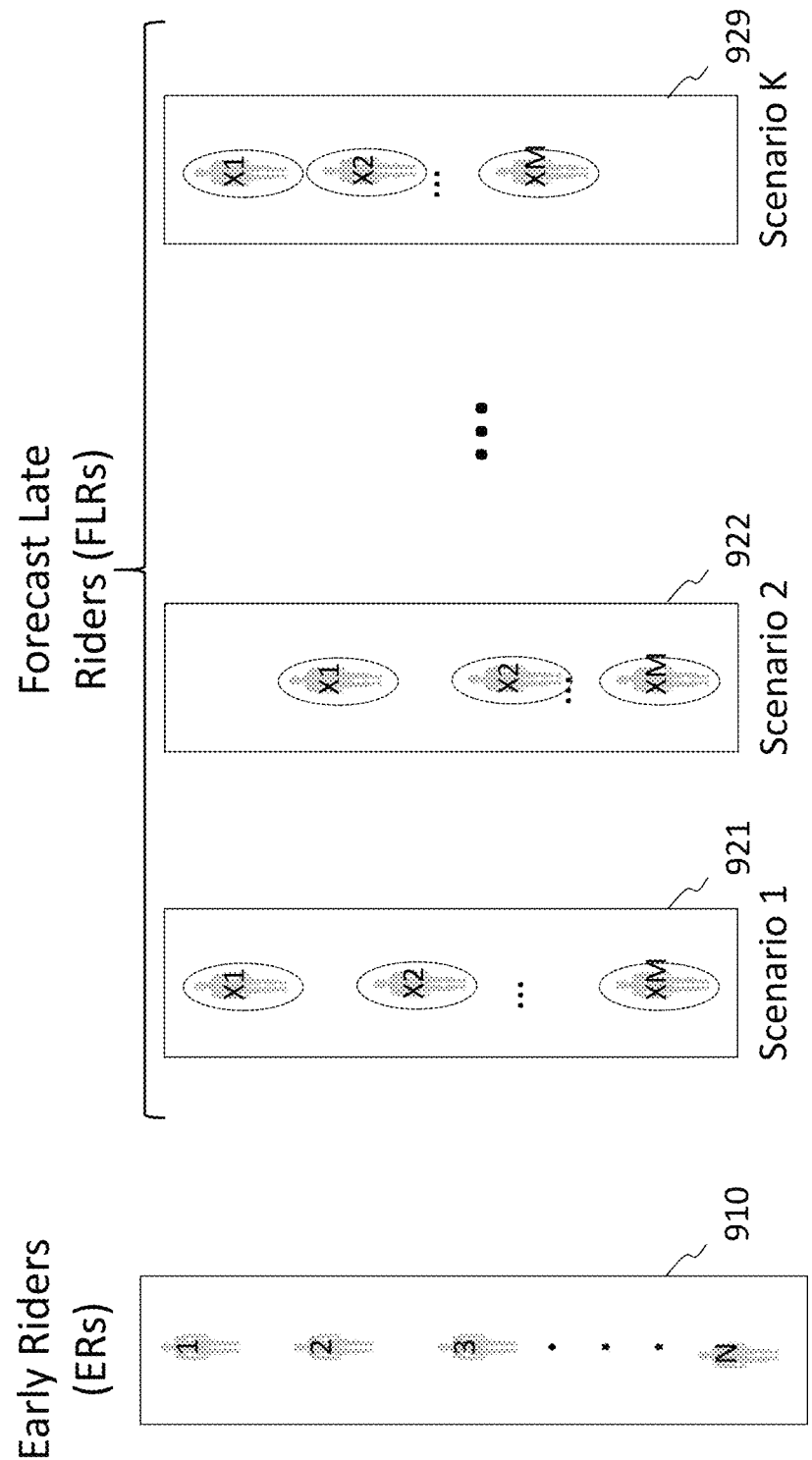
FIG. 9 is a schematic illustrating Early Riders (ERs)/known passengers and multiple scenarios of Forecast Late Riders (FLRs), wherein each scenario represents a possible materialization of Late Riders (LRs)/unknown passengers, according to some embodiments of the present disclosure.

FIG. 9 is a schematic illustrating Early Riders (ERs)/known passengers and multiple scenarios of Forecast Late Riders (FLRs), wherein each scenario represents a possible materialization of Late Riders (LRs)/unknown passengers, according to some embodiments of the present disclosure. The ERs are represented by a group of passengers in block 910, numbered from 1 to N. The FLRs for each scenario are represented by a group of passengers in blocks 921, 922, and 929. The scenarios are numbered from 1 to K. The FLRs on each scenario are numbered from 1 to M. The number of ERs, N, is known in advance. The number of scenarios and the number of FLRs on each scenario, K and M, are to be chosen from a multitude of ways such as, but not limited to, predefined values and inference based on historical MTN data from passengers previously transported. In each scenario, the requested destination and time of arrival at the destination are also obtained based on the historical MTN data.

Figure 10:
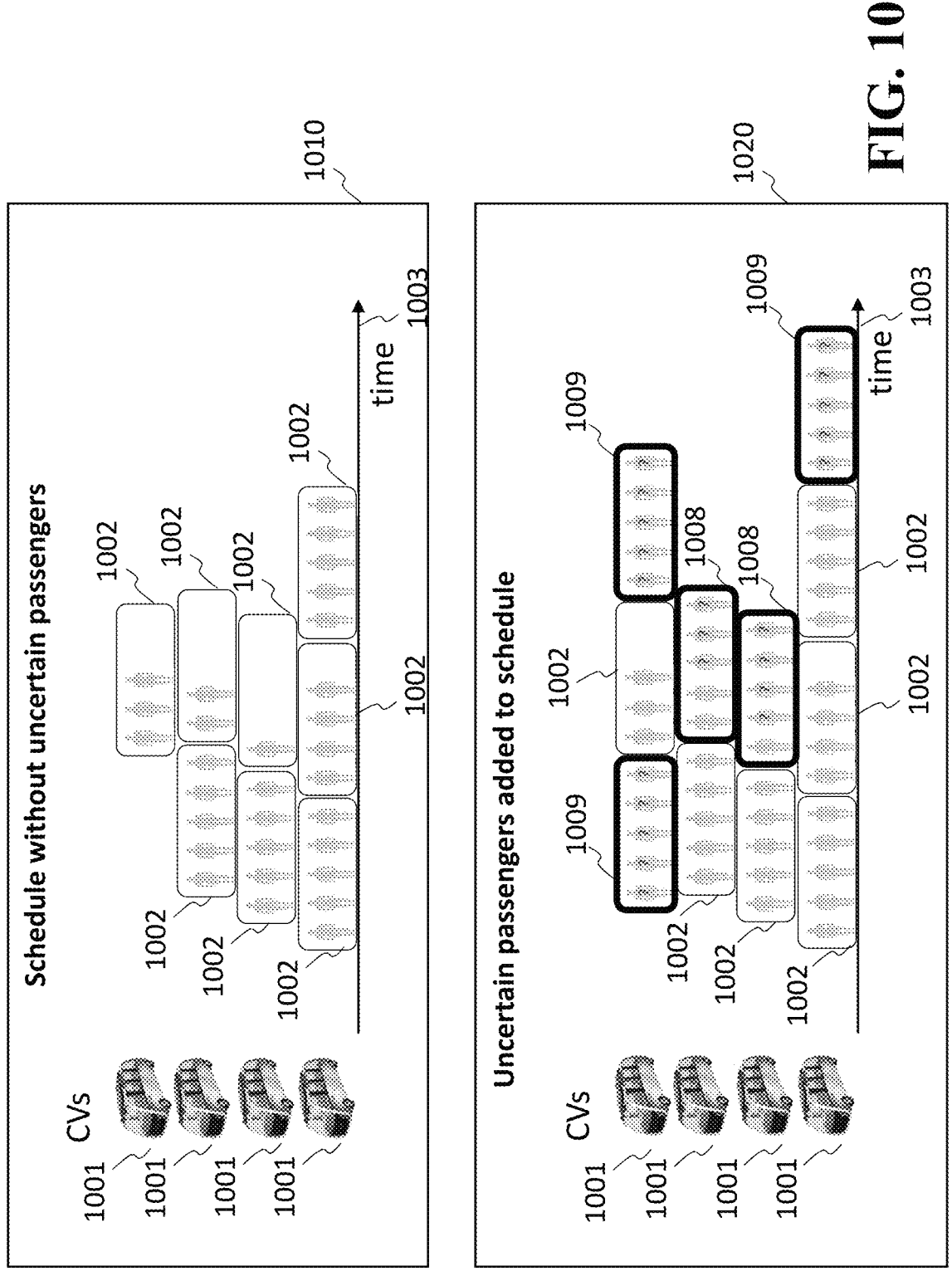
FIG. 10 is a schematic illustrating a schedule of passengers in which a CV trip may consist solely of Early Riders (ERs)/known passengers, solely of Late Riders (LRs)/unknown passengers, or a combination of both ERs and LRs, according to some embodiments of the present disclosure.

FIG. 10 is a schematic illustrating a schedule of passengers in which a CV trip may consist solely of Early Riders (ERs)/known passengers, solely of Late Riders (LRs)/unknown passengers, or a combination of both ERs and LRs, according to some embodiments of the present disclosure. The figure represents the groups occupying each CV 1001 along the time axis 1003, wherein each group 1002 consists solely of ERs. The schedule without uncertain passengers 1010 only depicts ER groups 1002. In box 1020, uncertain passengers are added to the schedule with ERs 1010. Each group 1002 consists solely of ERs and coincide with a group in the other box. Each group 1009 consist solely of LRs and occupies a CV for a time interval that has no overlap with the group schedules for ERs 1010. Each group 1008 consist of a combination of ERs and LRs, wherein a group 1002 with only the corresponding ERs 1010.

Figure 11:
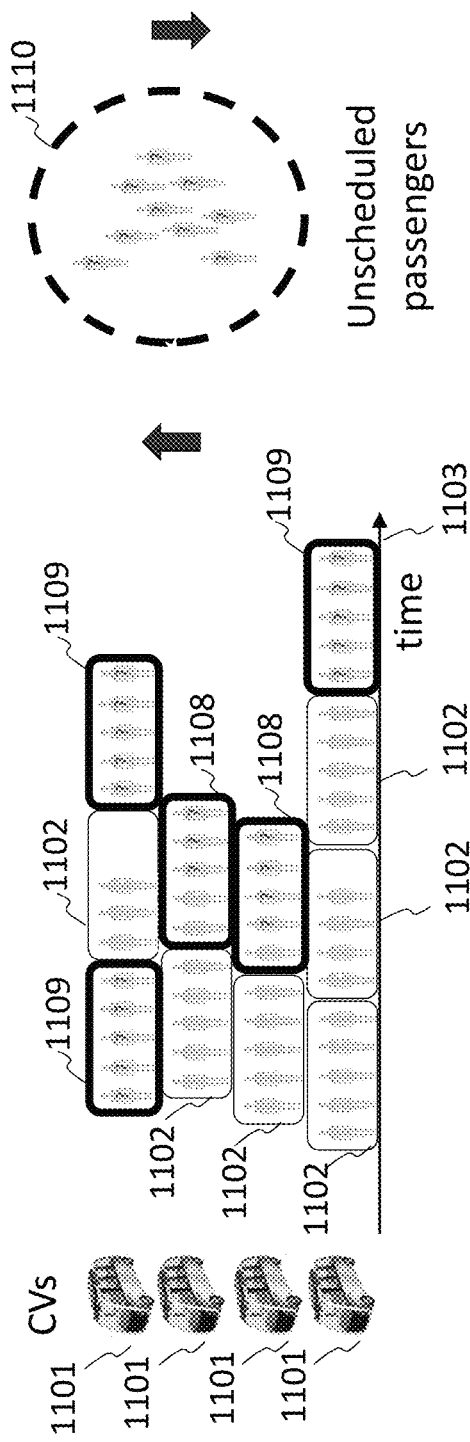
FIG. 11 is a schematic illustrating a construction of a schedule of passengers allocated to CV trips, where a set of Later Riders (LRs)/unknown passengers is gradually incorporated to a schedule previously consisting solely of Early Riders (ERs)/known passengers, according to some embodiments of the present disclosure.

FIG. 11 is a schematic illustrating a construction of a schedule of passengers allocated to CV trips, where a set of Later Riders (LRs)/uknown passengers is gradually incorporated to a schedule previously consisting solely of Early Riders (ERs)/known passengers, according to some embodiments of the present disclosure. The figure represents the groups occupying each CV 1101 along the time axis 1103, wherein each group 1102 consists solely of ERs, each group 1109 consist solely of LRs, and each group 1108 consist of a combination of ERs and LRs. The group of unscheduled passengers 1110 is reduced while the number of passengers assigned to groups in the CVs increases.

Figure 12:
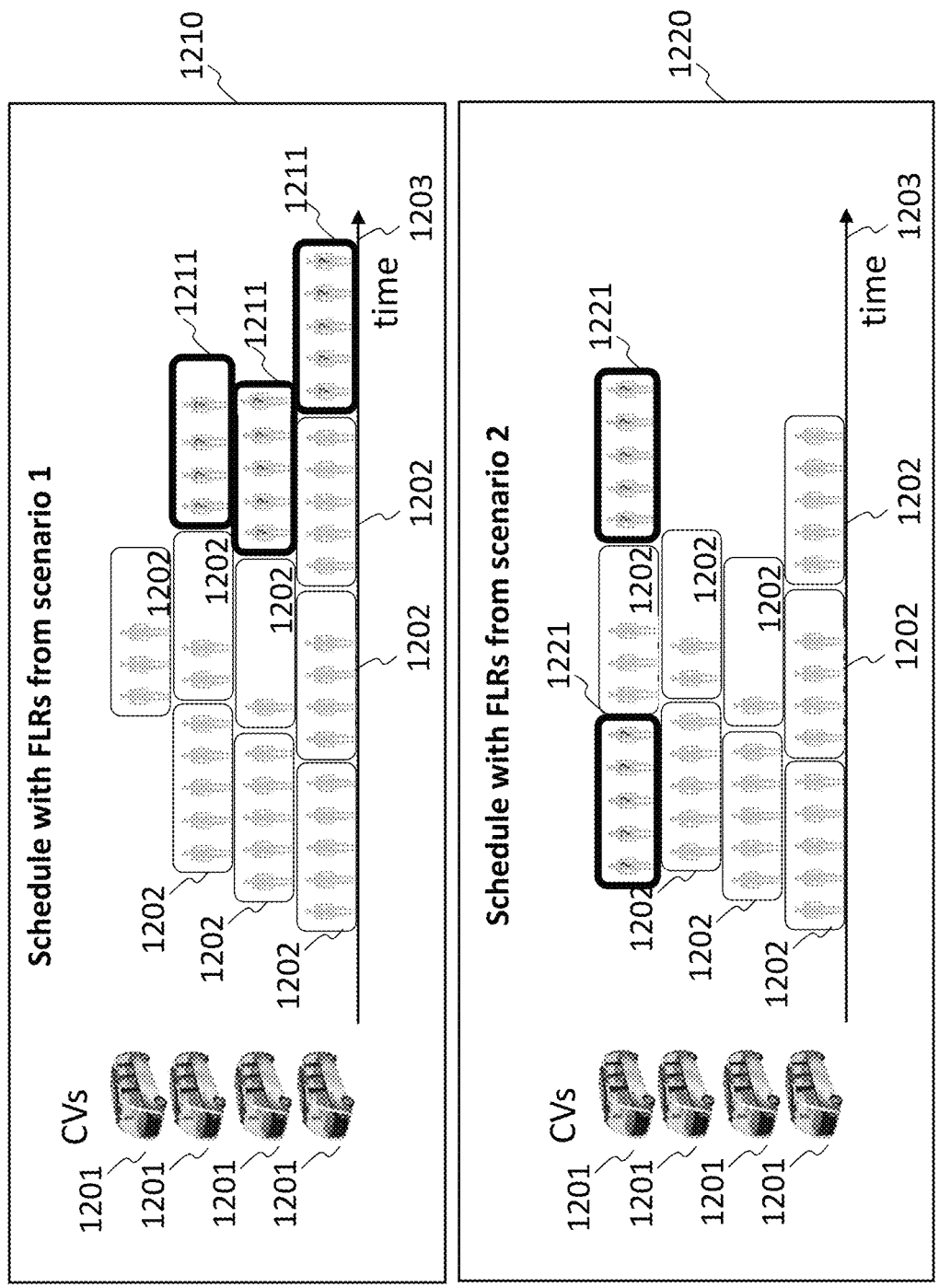
FIG. 12 is a schematic illustrating extended schedules resulting from adding Forecast Late Riders (FLRs) from each scenario to a schedule of passengers consisting solely of Early Riders (ERs)/known passengers, wherein the schedule of ERs is not affected by the inclusion of FLRs across the different scenarios, according to some embodiments of the present disclosure.

FIG. 12 is a schematic illustrating extended schedules resulting from adding Forecast Late Riders (FLRs) from each scenario to a schedule of passengers consisting solely of Early Riders (ERs)/known passengers, wherein the schedule of ERs is not affected by the inclusion of FLRs across the different scenarios, according to some embodiments of the present disclosure. The figure represents the groups occupying each CV 1201 along the time axis 1203, wherein each group 1202 consists solely of ERs. In box 1210 is depicted an extended schedule of passengers from a scenario 1 through the inclusion of groups 1211, wherein each of such groups consists solely of FLRs from scenario 1. In box 1221 is depicted an extended schedule of passengers from a scenario 2 through through the inclusion of groups 1221, wherein each of such groups consists solely of FLRs from scenario 1.

Figure 13A:
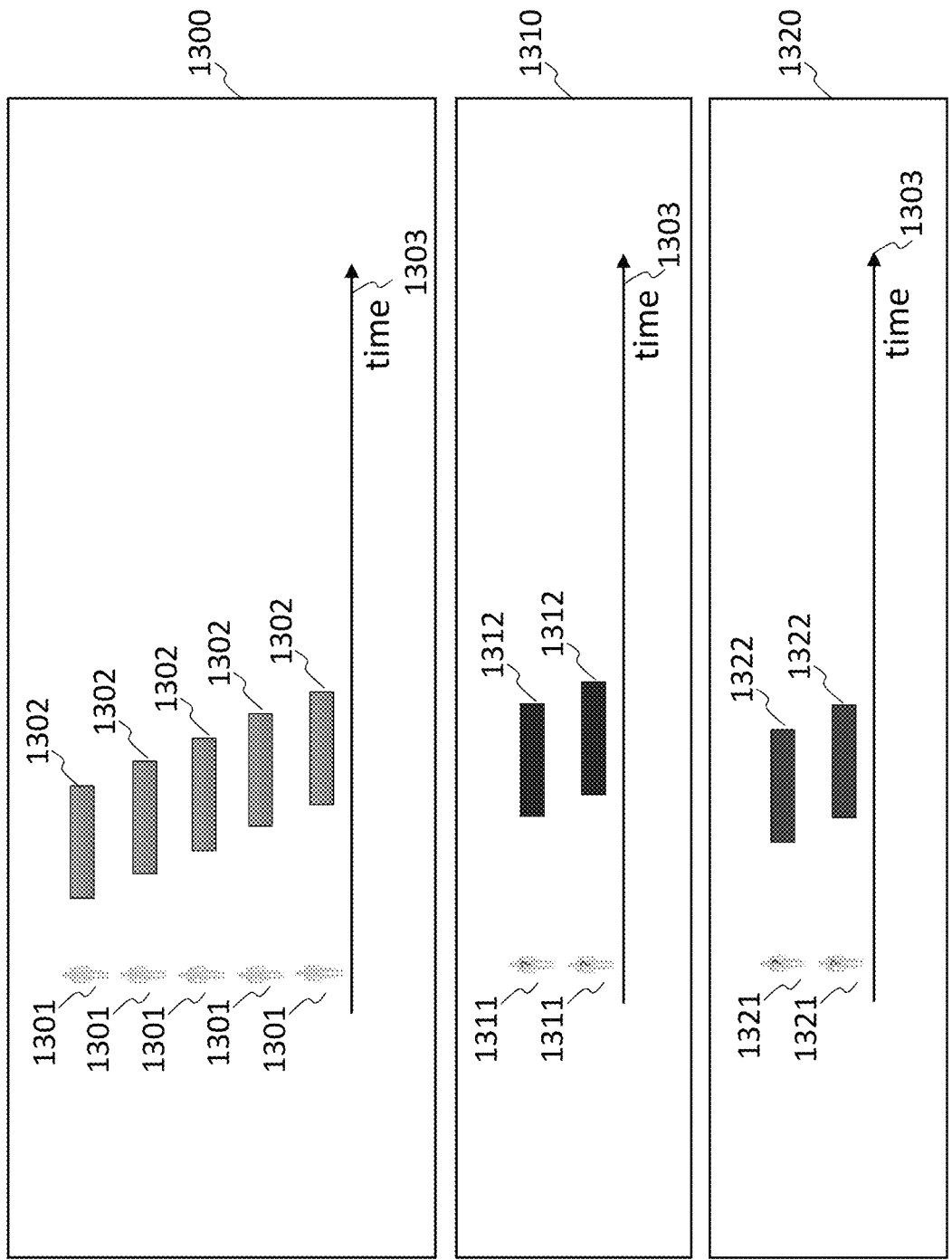
FIG. 13A, FIG. 13B, FIG. 13C and FIG. 13D are schematics illustrating some structures of optimal solutions, according to some embodiments of the present disclosure.
Figure 13B:
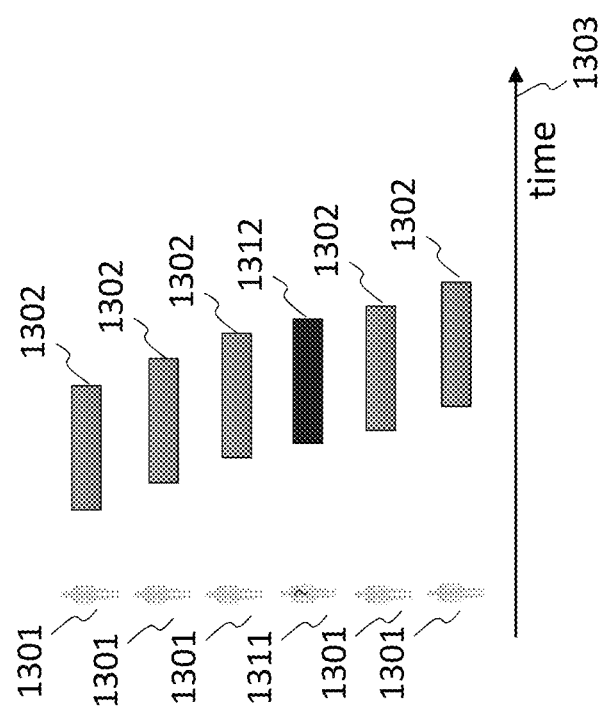
Figure 13C:
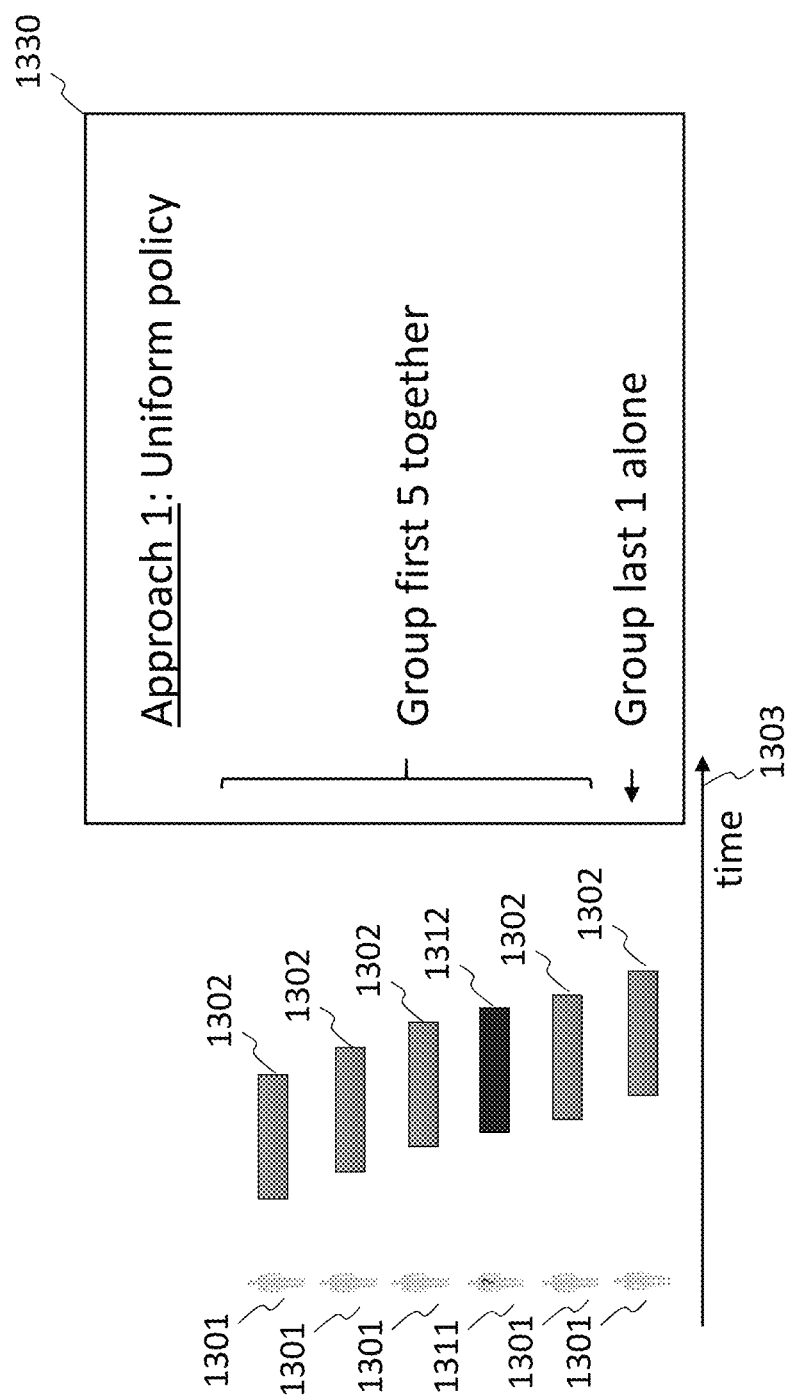
Figure 13D:
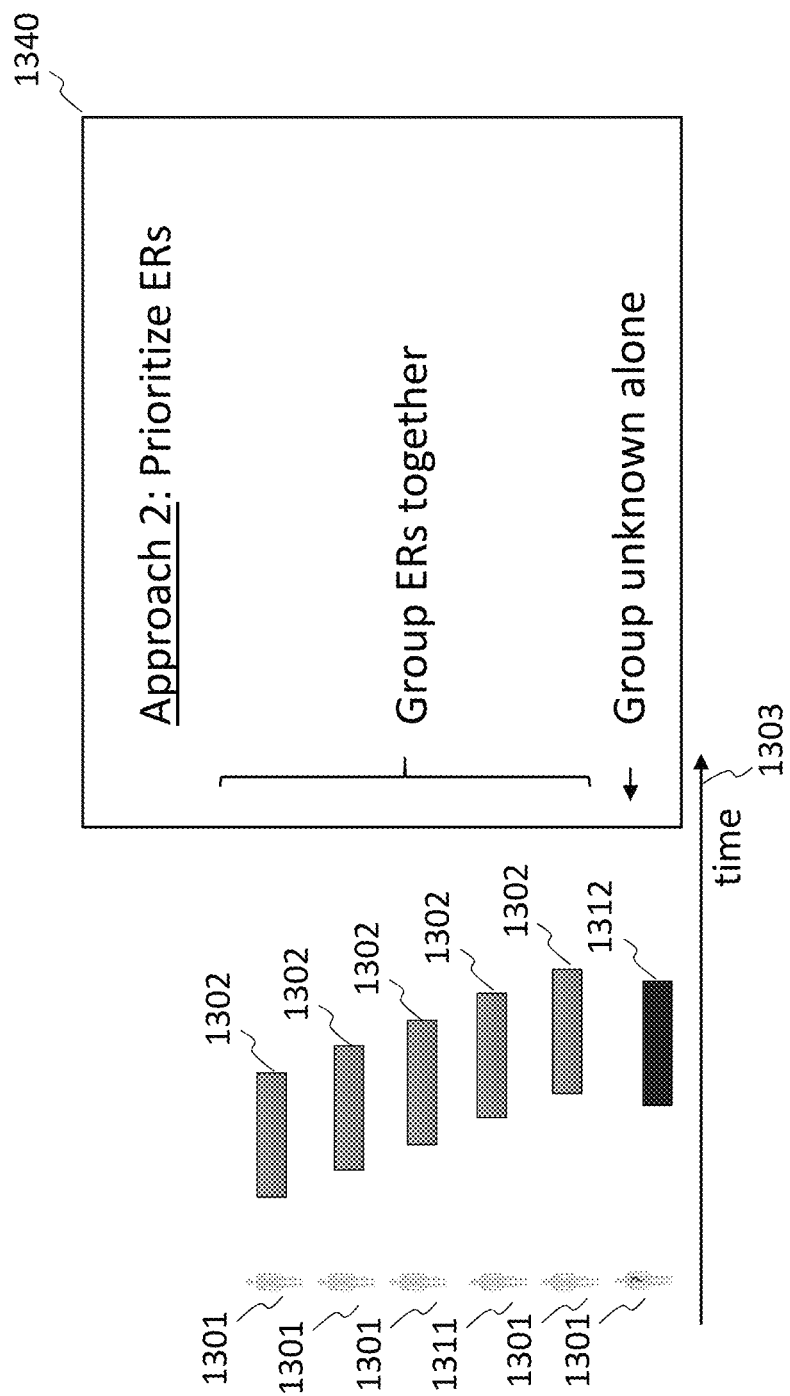

FIG. 13A-FIG. 13D are schematics illustrating some structures of optimal solutions, according to some embodiments of the present disclosure. In FIG. 13A, passengers having time windows for arrival of same length are sorted by the desired time for arrival, which defines a form of sequential grouping for which there exists an optimal solution for the scheduling problem. The box 1300 corresponds to the passengers that are ERs ordered by their desired time of arrival. The boxes 1310 and 1320 correspond to the passengers that are FLRs, wherein box 1310 represents scenario 1 and box 1320 represents scenario 2. In box 1300, each passenger 1301 is an ER with corresponding time window 1302. In box 1310, each passenger 1311 is an FLR from scenario 1 with corresponding time window 1312. In box 1320, each passenger 1321 is an FLR from scenario 2 with corresponding time window 1322. All time windows are plot against a time axis 1303. In FIG. 13B, a same form or ordering the passengers is presented while mixing passengers that are ERs with a FLR from scenario 1. In FIG. 13C, box 1320 depicts a grouping of passengers that defines two groups based on the ordering of the passengers. In FIG. 13D, box 1330 depicts a grouping of passengers in which the FLR is put in a separate group.

Figure 13E:
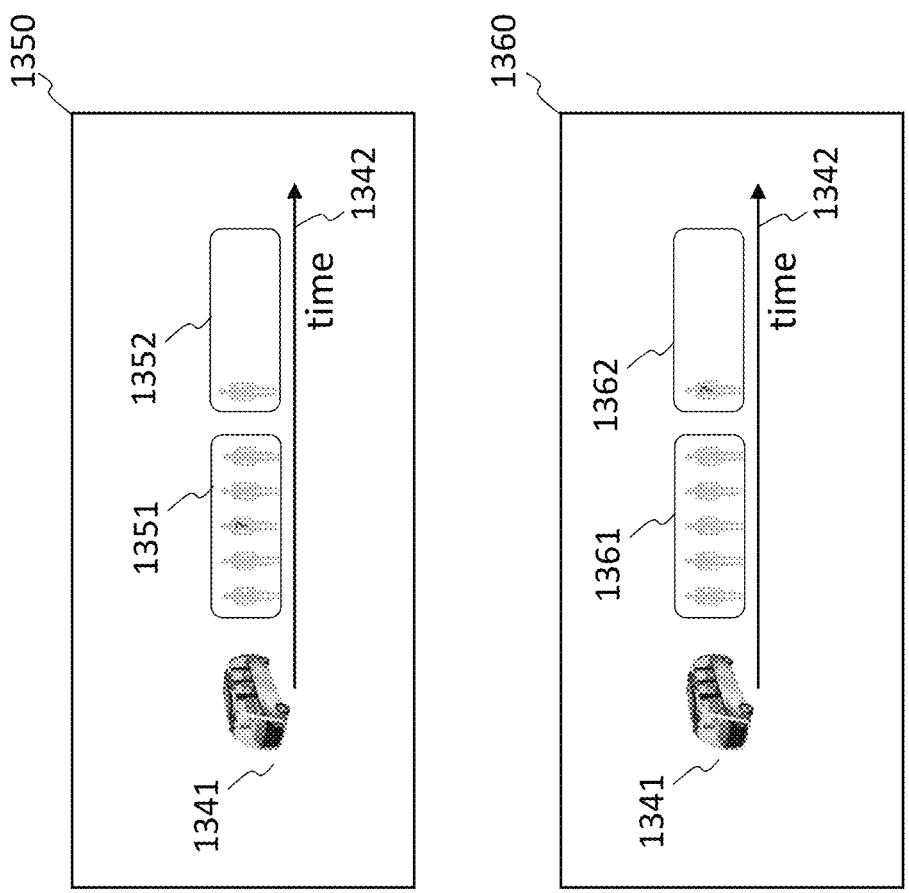
FIG. 13E is a schematic illustrating a difference in how the schedule of Early Riders (ERs)/known passengers and Forecast Late Riders (FLRs) affect a global cost of a schedule, according to some embodiments of the present disclosure.

FIG. 13E is a schematic illustrating a difference in how the schedule of Early Riders (ERs)/known passengers and Forecast Late Riders (FLRs) affect a global cost of a schedule, according to some embodiments of the present disclosure. In box 1350, the grouping from FIG. 13C is scheduled to a CV 1341 along the time axis 1342, where group 1351 represent the first 5 passengers and group 1352 represent the last passenger. In box 1360, the groupings from FIG. 13D is schedule to a CV 1341 along the time axis 1342, where group 1361 represent the group of ERs and group 1362 constrains the FLR. For a case in which there is only a single CV that can only perform one trip with no wait time and a second trip with wait time L, and further considering the existence of K scenarios, the solution defined in box 1350 implies a waiting time of L because the second group has an ER passenger. In contrast, the solution defined in box 1360 implies a waiting time of L/K because the second group has an FLR passenger, which only affects one out of K scenarios.

In another embodiment of the disclosure, a heuristic approach is proposed to obtain schedules for the Early Riders (ERs) and Forecast Late Riders (FLR) from each scenario. In this approach, each of the FLR passengers from each of the scenarios are assigned to accompany an ER passenger apriori. The assignments to an ER passenger is made subject to the ER passenger and the FLR passengers from a scenario having a start time of the CV and a route that allows them to reach their destinations within the desired arrival time windows from the intermediate location. The number of assignments of FLR passengers from any scenario to an ER passenger is also restricted to one less than the capacity of the CV. The number of seats occupied by an ER passenger in the CV is then augmented by the maximum over the scenarios of the number of FLR passenger assignments. This ensures that the ER passenger and assigned FLR passengers from any scenario can be fit in a CV.

Figure 14A:
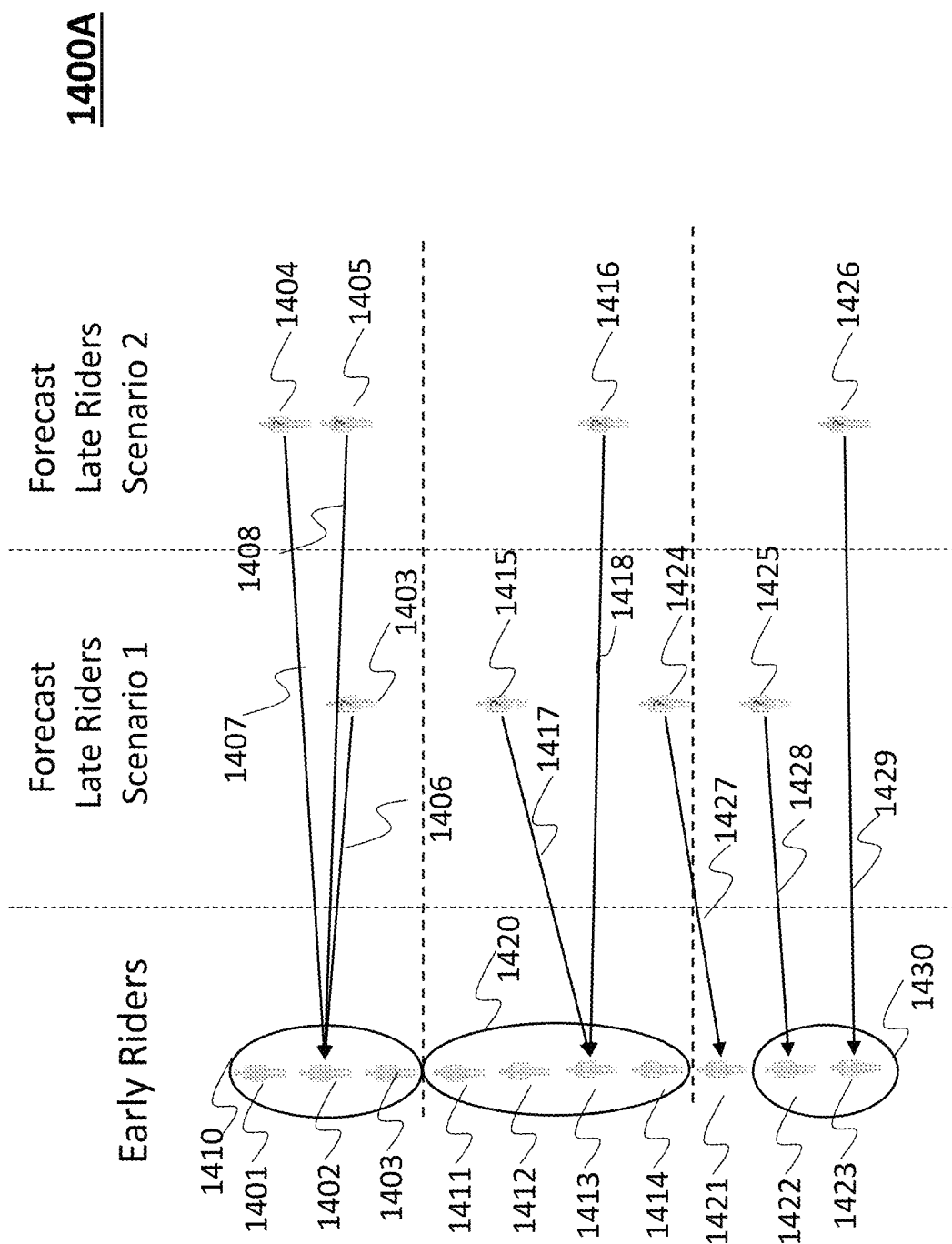
FIG. 14A is a schematic illustrating the heuristic approach, according to some embodiments of the present disclosure.

FIG. 14A is a schematic illustrating the heuristic approach according to some embodiments of the disclosure. Consider a scheduling situation 1400A where there are a set of ER passengers and two scenarios of FLR passengers. The FLR passenger 1403 in the first scenario is assigned 1406 to accompany the ER passenger 1402. The FLR passengers 1404 and 1405 in the second scenario are also assigned to accompany the ER passenger 1402. Based on these associations, the number of seats occupied by the ER passenger 1402 in the CV is three since there are two additional FLR passengers from the second scenario that are assigned to accompany the ER passenger 1402. On the other hand, the ER passengers 1401, 1403, 1411 occupy only one set in the CV each. Suppose the capacity of the CV is five. Based on these associations, group 1410 is a feasible grouping of ER passengers that satisfy the CV capacity of five. However, the passenger 1411 cannot be added to the group 1410 since that will result in a total CV seat occupancy of six which will be larger than the CV seat capacity of five. Similarly, ER passenger 1413 is assigned 1417 the FLR passenger 1415 from scenario 1 and is also assigned 1418 the FLR passenger 1416 from scenario 2. Based on these assignments, the capacity of the ER passenger 1413 in the CV is two. The group 1420 consisting of ER passengers 1411, 1412, 1413 and 1414 is at the CV capacity of five and cannot include additional ER passengers. The ER passenger 1421 is assigned 1427 the FLR passenger 1424 from scenario 1. The ER passenger 1422 is assigned 1428 the FLR passenger 1425 from scenario 1. The ER passenger 1423 is assigned 1429 the FLR passenger 1426 from scenario 2. Thus, the capacities of the of capacity of the ER passengers 1421, 1422 and 1423 is each two. Hence, the ER passengers 1421, 1422 and 1423 cannot together form a group since the result seat occupancy of six exceeds the CV capacity of five. The ER passenger 1421 forms a separate group.

Figure 14B:
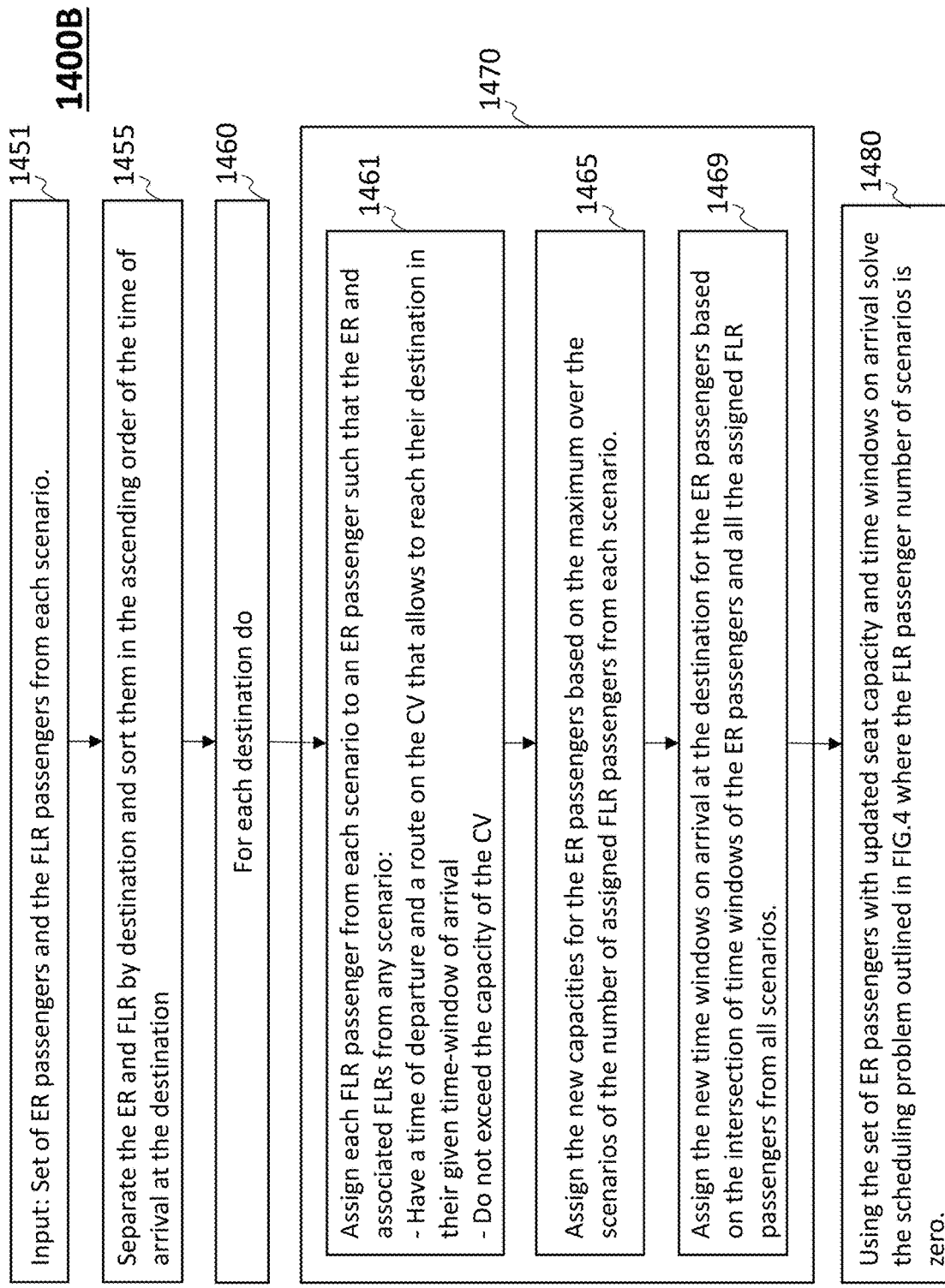
FIG. 14B is a flowchart depicting the algorithm for scheduling the Early Riders (ER) and Forecast Late Riders (FLR) passengers by the heuristic approach, according to some embodiments of the present disclosure.

FIG. 14B is a flowchart depicting the algorithm for scheduling the ER and FLR passengers by the heuristic approach according to some embodiments of the present disclosure. The algorithm 1400B takes as input the set of the ER passengers and the FLR passengers from a set of scenarios 1451. The set of the ER and FLR passengers in each scenario are first separated by destination and sorted in increasing order of time windows of arrival at the destination 1455. A loop 1470 is executed for each destination 1460. For each destination, the FLR passengers in each scenario are assigned to a ER passengers 1461. Based on the assignments to the ER passengers, the capacities 1465 and the time windows for arrival at the detination for the ER passengers are updated 1469. The ER passengers with the updated capacities and time windows on arrival at the destination form a scheduling problem where the FLR passengers have already been accounted for. The updated ER passengers is solved using the algorithm outline in FIG. 4 as an instance where the number of scenarios is zero 1480.

Features

Contemplated is that the system, can include any combination of the different aspects listed below. The system is for scheduling of early riders (ERs) and late riders (LRs), wherein the LRs are unknown at a time the ERs are scheduled, to vehicles in a multi-modal transportation network (MTN). The system including at least one processor connected to an interface and a memory. Stored in the memory is MTN data and ER itinerary requests, and instructions that, when executed by the at least one processor, cause the at least one processor to perform acts including forecasting a finite set of scenarios, each scenario comprising a possible set of forecast LRs (FLRs) itinerary requests. Wherein the finite set of scenarios is generated from past ERs and past LRs completed travel obtained from the MTN data. Iteratively, generate ER groups and FLR groups for each scenario, based on a desired time of arrival at a destination. Assign a commuter vehicle (CV) for each ER and FLR group in each scenario of the finite set of scenarios. Iteratively, determine for each ER and FLR group a start time and an arrival time at the destination in the corresponding CV, for which, the ER and FLR group are assigned. Wherein a total number of riders of all groups traveling in a CV at any given time does not exceed a capacity of the CV, and there exists a route that takes riders from their location to their destination. Wherein the iterations continue until a joint schedule for the ERs and the FLRs form each scenario that minimizes an objective function. Formulate assignment information, and transmit, via the interface, the assignment information to the ERs and the assigned CVs.

According to aspects of the present disclosure, the number of CVs that are concurrently serving the ER groups and the FLR groups from each scenario is less than a fleet capacity. An aspect can be that each scenario of FLRs represents a likely materialization of an amount of expected LRs that will be used to ensure that the scheduling of the ERs provides for a capability of scheduling the LRs at a later time. Another aspect is that the LRs provide itinerary requests at a later time than a time at which the ERs itinerary requests are received by the MTN, such that each LR and ER itinerary request includes an origin location, a destination and a desired time window of arrival at the destination. Further, another aspect can be that the desired time is within a time window of an arrival time at the destination. Further still, that a CV trip includes one of, from the transfer station to the target destination, from the target destination to the transfer station, or both.

According to aspects of the present disclosure, the FLR travel is realized travel by past LRs at an approximate time of day, as an intended time of travel of the ERs expressed in the received ERs travel requests. Another aspect, the number of FLRs for each scenario is a preset number of LRs provided by an operator and is obtained from MTN data. Further, another aspect is that the FLRs locations and a desired time window of arrival at the destination are obtained from the past LRs travel obtained from the stored MTN data. Further still, another aspect is that for each ER group in the ER groups includes at least one route for the CV, a start time for that route, such that an arrival deadline of each ER in the ER groups is satisfied. An aspect can be that the assignment information includes the assigned CVs to the ER groups, the routes assigned to the CVs, locations and start times of the assigned CVs from the locations.

According to aspects of the present disclosure, the total travel time for the rider is a sum of an amount of travel time a rider spent riding in one or more mode of transportation of the MTN, an amount of time the rider spent waiting for the assigned CV at an intermediate location, a terminal station or a station depot of the MTN, and an amount of time spent traveling in the CV to reach the rider target destination.

According to aspects of the present disclosure, the iteration processes for generating the ER groups, and FLR groups for each scenario, and the assigning the CVs and scheduling the CV trips is based on solving an optimization under uncertainty problem. Wherein the optimization under uncertainty problem is one of a multi-stage stochastic optimization problem or a robust optimization problem. Wherein the objective function is an expected value of a metric that uses a weighting factor between a total rider waiting time and a number of CV trips. Wherein the optimization under uncertainty problem includes constraints to ensure that ERs reach their target destination within the arrival time windows of the ERs and ensures that a number of ERs in each of the ER groups is smaller than a maximum capacity number of seats in the CVs, that a route-search program and an operation route map program provide respective travel times for the CVs, wherein the constraints ensure that a number of CVs operating simultaneously is smaller than a total number of available CVs in a fleet of the MTN.

Another aspect of the present disclosure can include wherein the number of CVs that are concurrently serving the ER groups and the LR groups is less than a fleet capacity. An aspect is that the CV is associated with, or part of, one of a private multi-modal transportation network (MTN), a private rider multi transportation system, an airport rider transportation system, a rider transportation system of at least one business or a rider sharing transportation system.

According to other aspects of the present disclosure, the location of a rider includes one of a transfer station of the MTN, an originating station of the MTN or an intermediate station of the MTN, and the destination of the rider includes one of a target destination, a destination building or a final destination. Further an aspect can be that, when an itinerary request by the ER includes a preferred option that indicates a minimum total cost to be paid by the ER, the ER is assigned to a group that satisfies another constrain for minimizing a sum of costs of a fixed scheduled vehicle of the MTN and an assigned CV. Further still, an aspect may be that the operation statuses of the CVs are monitored and updated by receiving a status information from each of the CVs via an information interface connected to the processor, wherein the operation statuses include locations of the CVs and a number of available seats of each of the CVs, such that the updated operation statuses are stored into the memory.

Contemplated is that the system, can include any combination of the different aspects listed below. The system for scheduling commuter vehicles (CVs) in a multi-modal transportation network (MTN) having early riders (ERs)/known passengers and late riders (LRs)/uncertain passengers, an interface that receives itinerary requests from the ERs and LRs. The system including a memory to store MTN data and computer executable programs including a grouping program, a route-search program, an operation route map program of CVs, an LR program and a commuter assigning program. A processor connected to the interface and memory, to perform the computer executable programs, configured to execute the grouping program including: solve an optimization problem to generate a set of solutions by obtaining solutions according to a set of weighting factors and combinations of total travel times of the ERs and a number of groups. Execute the LR program including identify a number of the ERs willing to share a ride in the CV's, to obtain a subset of ERs solutions, and a number of LRs provided by the operator. Determine, a number of groups of LRs target locations corresponding to the target locations to some of the subset of ERs solutions, and determine LRs start times on the CVs corresponding to some of the subset of ERs solutions. Execute a modified grouping program including identify for each group of the number of groups from the subset of ERs solutions, an assigned CV for that group of ERs, a start time at which the group is to travel on the assigned CV, as well as a remaining rider capacity for the assigned CV for that group, so as to identify an assignable number of LRs to that group without exceeding a maximum CV rider capacity. Execute the commuter assigning program including assign a number of LRs to each group from the subset of ERs solutions without exceeding the maximum CV rider capacity. Update the assignment information that includes the assigned CVs to the groups with ERs and LRs, the routes assigned to the CVs, station depot locations and start times of the assigned CVs from the station depot locations. Transmit the updated assignment information to the assigned CVs via the interface.

According to other aspects of the present disclosure, the grouping program includes determine a number of groups of the ERs based on ERs target locations and determine ERs start times on the fixed schedule vehicles (FSVs) and the CVs, from the received itinerary requests. Solve the optimization to generate a solution defining the groups of ERs and the ERs start times on the FSVs and the CVs. Wherein the optimization further includes, iteratively, generating the set of solutions by obtaining solutions according to the set of weighting factors and combinations of total travel times of the ERs and the number of groups. Choose a solution among the set of solutions obtained for linear combinations of the total travel times of the ERs and the number of groups. An aspect can include the grouping program determines the ER schedules to minimize a total travel time for all riders in the MTN, so as to achieve a social optimum, and wherein the modified grouping program determines the ERs and the LRs schedules to minimize the total travel time for all riders in the MTN, to achieve the social optimum. Another aspect can include the modified grouping program is configured to determine a subset of ERs that share in the CVs, along with determining a remaining rider capacity on some ER rides, so that later requests from the other riders, including the URs, are added to some ER rides. An aspect can include that, if an UR is unable to be scheduled or the commuter assigning program does not yield a feasible schedule for the groups, then as many URs are scheduled as possible given the constraints, or a relaxed amount of arrival time windows of the groups is instituted, and penalize an amount of relaxation time in the objective function. Another aspect is that the assigning the CVs to the groups and routes for the CVs is by generating the assignment information of the assigned CVs among the CVs based on the chosen solution.

At least one embodiment includes a system for scheduling of early riders (ERs) and late riders (LRs). Wherein the LRs are unknown at a time the ERs are scheduled, to vehicles in a multi-modal transportation network (MTN). The system including at least one processor connected to an interface and a memory, stored in the memory is MTN data and ERs itinerary requests, and instructions that, when executed by the at least one processor, cause the at least one processor to perform acts including forecasting a finite set of scenarios, each scenario comprising a possible set of forecast LRs (FLRs) itinerary requests. Wherein the finite set of scenarios is generated from past ERs and past LRs completed travel obtained from the MTN data. Iteratively, generate ER groups, and FLR groups for each scenario, based on a desired time of arrival at a destination. Assign a commuter vehicle (CV) for each ER and FLR group in each scenario of the finite set of scenarios. Iteratively, determine for each ER and FLR group a start time and an arrival time at the destination in the corresponding CV, for which, the ER and FLR group are assigned. Wherein a total number of riders of all groups traveling in a CV at any given time does not exceed a capacity of the CV, and there exists a route that takes riders from their location to their destination. Wherein the iterations continue until a joint schedule for the ERs and the FLRs form each scenario that minimizes an objective function. Formulate assignment information, and transmit, via the interface, the assignment information to the ERs and the assigned CVs.

Definitions

A multi-modal transportation network may include a public transportation sub-network, and a private transportation sub-network for use by private transport, e.g. a road network (a "private transportation sub-network" as referred to herein). These types of network have different properties. Times of entry, exit and travel through a public transportation network are constrained, such that entry, exit and travel through the network may only occur at specific times, i.e. in accordance with a schedule associated with the network. In contrast, such constraints do not exist in relation to a private transportation network, such as a road network, when using private transport. In a private transportation network, a user may choose to enter, exit or travel through the network freely, at a time of their choosing. Examples of public transportation include various fixed schedule vehicles, i.e., vehicles with fixed and/or predetermined schedule and cannot be modified to suit the convenience or requirements of the user. Examples of the fixed schedule vehicles include one or combinations of a train, a bus, a boat, and a plane. Examples of private transportation include various flexibly scheduled commuter vehicles such as an autonomous vehicle, a semi-autonomous vehicle, and a vehicle operated by a driver. Flexibly scheduled commuter vehicles allow for their route times to be specified in accordance with the needs of the passengers.

Fixed schedule vehicles can have schedules that can be adapted to the needs of the passengers and unconstrained passenger capacities to transport a set of passengers to or from an intermediate location. As referred herein, the unconstrained passenger capacities can be understood as that of the maximum capacity of scheduled vehicles, which is not considered in the scheduling and controlling solution. In contrast, the commuter vehicles that can have unconstrained schedules, and a maximum passenger capacity to transport the passengers to or from the intermediate location via one of a route selected from a set of predetermined routes.

Figure 15A:
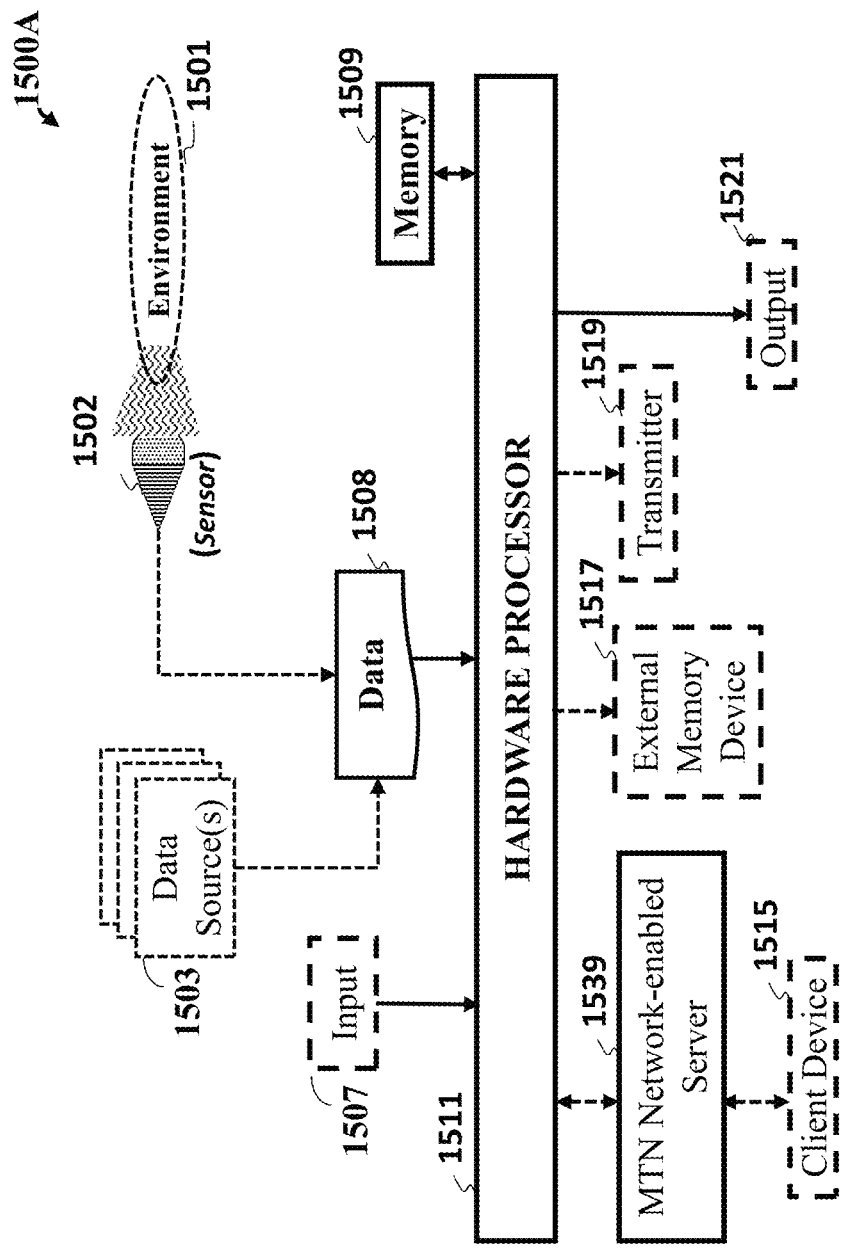
FIG. 15A is a block diagram illustrating some components that can be used for implementing the systems and methods, according to some embodiments of the present disclosure.

FIG. 15A is a block diagram illustrating some components that can be used for implementing the systems and methods, according to embodiments of the present disclosure. For example, system and method 1500A can include the hardware processor 1511 in communication with a sensor 1502 or sensors, such as a sensor, that collects data including an environmental signal(s) 1508 from an environment 1501. The environmental signal can include multiple sensors. Further, the environmental sensor 1502 can convert an input into the environmental signal. Contemplated is that other types of sensors can be utilized other than environmental sensors, such as machine monitoring sensors, components of a transportation that utilize a sensor to obtain data related to managing the MTN. The hardware processor 1511 is in communication with a computer storage memory, i.e. memory 1509, such that the memory 1509 includes stored data, including algorithms, instructions and other data, that can be implemented by the hardware processor 1511.

Optionally, the hardware processor 1511 can be connected to a network 1507, that is in communication with a data source(s) 1503, computer device 1504, a mobile phone device 1505 and a storage device 1506. Also optionally, the hardware processor 1511 can be connected to a network-enabled server 1513 connected to a client device 1515. The hardware processor 1511 can optionally be connected to an external memory device 1517, a transmitter 1519. Further, the text for each target speaker can be outputted according to a specific user intended use 1521, for example, some types of user use can include displaying the text on one or more display device, such as a monitor or screen, or inputting the text for each target speaker into a computer related device for further analysis, etc.

It is contemplated the hardware processor 1511 can include two or more hardware processors depending upon the requirements of the specific application, wherein the processors can be either internal or external. Certainly, other components may be incorporated with systems and methods 1500BA including output interfaces and transceivers, among other devices.

It is possible the network 1507 can include, by non-limiting example, one or more local area networks (LANs) and/or wide area networks (WANs). Wherein the networking environments can be similar to enterprise-wide computer networks, intranets and the Internet. Contemplated for all the components mentioned that there can be any number of client devices, storage components, and data sources employed within the system 1500A. Each may comprise a single device or multiple devices cooperating in a distributed environment. Further, system 1500A can include one or more data source(s) 1503. Data source(s) 1503 may comprise data resources for training a transportation network. For example, in an embodiment, the training data can include signals of multiple components. The training data can also include signals of a single component alone.

Some examples of data sources 1503 may include by way of example, and not limitation, various sources including streaming sounds or video, web queries, mobile device camera or audio information, web cam feeds, smart-glasses and smart-watch feeds, customer care systems, security camera feeds, web documents, catalogs, user feeds, SMS logs, instant messaging logs, spoken-word transcripts, gaming system user interactions such as voice commands or captured images (e.g., depth camera images), tweets, chat or video-call records, or social-networking media. Specific data source(s) 1503 used may be determined based on the application including whether the data is a certain class of data (e.g., data only related to specific types of sounds, including machine systems, entertainment systems, for example) or general (non-class-specific) in nature.

System 1500A can include third party devices 1504, 1505, which can comprise of any type of computing device. For example, the third party devices including a computer device 1504, or a mobile device 1505, such as the type of mobile computing device described in relation to FIG. 15B, herein. Contemplated is that a user device may be embodied as a personal data assistant (PDA), a mobile device, such as a smartphone, smart watch, smart glasses (or other wearable smart device), augmented reality headset, virtual reality headset. Further, the user device could be a laptop, such as a tablet, remote control, entertainment system, vehicle computer system, embedded system controller, appliance, home computer system, security system, consumer electronic device, or other similar electronics device. In one embodiment, the client device is capable of receiving input data such as audio and image information usable by an ASR system described herein that is operating on the device. For example, the third party device may have a microphone or line-in for receiving audio information, a camera for receiving video or image information, or a communication component (e.g., Wi-Fi functionality) for receiving such information from another source, such as the Internet or a data source 3.

Example third party devices 1504, 1505 are optionally included in system 1500A to illustrate an environment that the deep neural network model may be deployed. Further, some embodiments of the present disclosure may not include third party devices 1504, 1505. For example, a deep neural network model can be on a server or in a cloud network, system or like arrangement.

Regarding the storage 1506, the storage 1506 can store information including data, computer instructions (e.g., software program instructions, routines, or services), and/or models used in embodiments of the technology described herein. For example, the storage 1506 can store data from one or more data source(s) 3, one or more deep neural network models, information for generating and training deep neural network models, and the computer-usable information outputted by one or more deep neural network models.

Figure 15B:
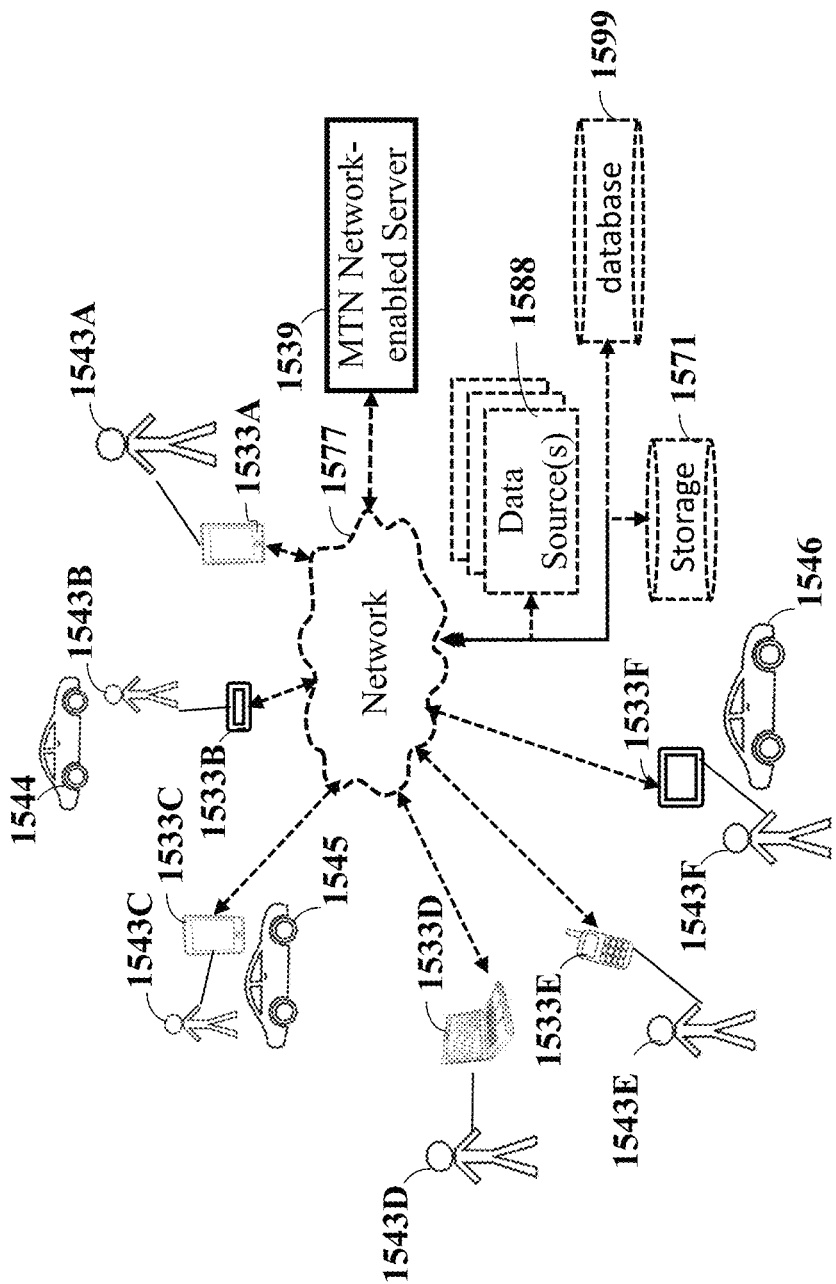
FIG. 15B is a schematic illustrating a multi-modal transportation network system of FIG. 15A, for scheduling commuter vehicles, according to some embodiments of the present disclosure.

FIG. 15B is a schematic illustrating a multi-modal transportation network system of FIG. 15A, for scheduling commuter vehicles, according to embodiments of the present disclosure. For example, the MTN Network-enable server 1513 of the system for scheduling commuter vehicles (CVs) can include mobile communications devices 1533A-1533F, a network 1577, data storage 1571, a data source 1588, and database 1599. The mobile communications devices 1533A-1533F can be directed to users 1543A-1543F, respectively. Wherein vehicles 1544, 1545, 1546 may be associated with some mobile communications devices 1533B, 1533C, 1533F, associated with drivers 1543B, 1543C and 1543F, respectively.

It is possible that the MTN network-enabled server or MTN server 1513, can further be associated with driving control systems associated with autonomous vehicles, i.e. CVs. Further, the MTN server can be multiple servers, depending upon the application(s) in view of the management of the MTN, geographical area, etc.

Still referring to FIG. 15B, the network 1577 can assist in the communications between user wireless communications devices 1533A-1533F and the MTN server 1513. For example, the network 1577, according to at least one embodiment, may receive ride requests and other ride server related information, from the user's wireless communications devices 1533A-1533F. Also possible, is that the network 1577 can send ride service assignments to control devices 1533B, 1533C and 1533F, i.e. wireless communications devices, for the vehicles 1544, 1545, 1546. Contemplated is the network 1577 may be a type of network may provide other types of communications, exchange information, and/or provide exchange of information between MTN server 1513 and wireless communications devices 1533A-1533F. For example, network 1577 may be the Internet, a Local Area Network, a cellular network, a public switched telephone network ("PSTN"), or other suitable connection(s) that enables ridesharing. The network 1577 may also provide different types messaging formats, and may further support a variety of services and applications for wireless communications devices 1533A-1533F. For example, network 1577 may support navigation services for wireless communications devices 1533A-1533F, such as directing the users 1543B, 1543C, 1543F, and service vehicles to pick-up or drop-off locations.

MTN server 1513 can be equipped to provide communications including different types of data or services, such as messaging, voice, real-time audio/video, to users, 1543A-1543F. MTN server 1513 may be a computer-based system including computer system components, desktop computers, workstations, tablets, handheld wireless communications devices 1533A-1533F, memory devices, and/or internal network(s) connecting the components. MTN server 1513 may be configured to receive information from wireless communications devices 1533A-1533F over network 1577, process information, store information, and/or transmit information to wireless communications devices 1533A-1533F over network 1577. For example, in some embodiments, the MTN server 1513 can receive ride requests from wireless communications devices 1533A-1533F, send ride confirmation and ride fare information, and send ride service assignments to drivers of the vehicles and control devices of vehicles.

Still referring to FIG. 15B, the database 1599 can include physical or cloud type storages coupled with MTN server 1513, and can store user account information, corresponding user profiles such as contact information, profile photos, and associated wireless communications device 1533A-1533F information. With respect to users 1543A-1543F or taxi riders that pay fares, user/taxi rider account information, may further include ride history, service feedbacks, complaints, or comments. The database 1599 can also include traffic data, regional maps, and toll road information, that can be used for managing ridesharing services or other related aspects for the users 1543A-1543F. The data stored in database 1599, storage 1571 or data sources 1588 can be transmitted to MTN server 1513 for accommodating ride requests, user needs, etc. database 1599, storage 1571 or data sources 1588 can be stored in a cloud-based server accessible by MTN server 1513 and/or wireless communications devices 1533A-1533F through network 1577.

The wireless communications devices 1533A-1533F may include a display such as a television, tablet, computer monitor, video conferencing console, or laptop computer screen. Further the communication devices 1533A-1533F may be a tablet or a smartphone having display and video/audio capture capabilities, having software applications that facilitate communications, such as IM, VoIP, video conferences.

In some embodiments, wireless communications devices 1533B, 1533C and 1533F, can be connected in a control panel of vehicles 1544, 1545, 1546, as a part of a control system associated with a particular vehicle, similar to commercial or private taxis managed by taxi companies. For example, users 1543B, 1543C and 1543F, and the associated wireless communications devices 1533B, 1533C, 1533F, can be coupled with a payment device, such as a card reader installed as a part of the control panel and/or as a separate device associated with the vehicle 1544, 1545, 1546. The user 1543B, 1543C and 1543F may then use the associated payment device as an alternative payment mechanism. For example, person accepting a taxi, i.e. vehicle 1544, 1545, 1546, can pay the taxi fare via the payment device.

Figure 16:
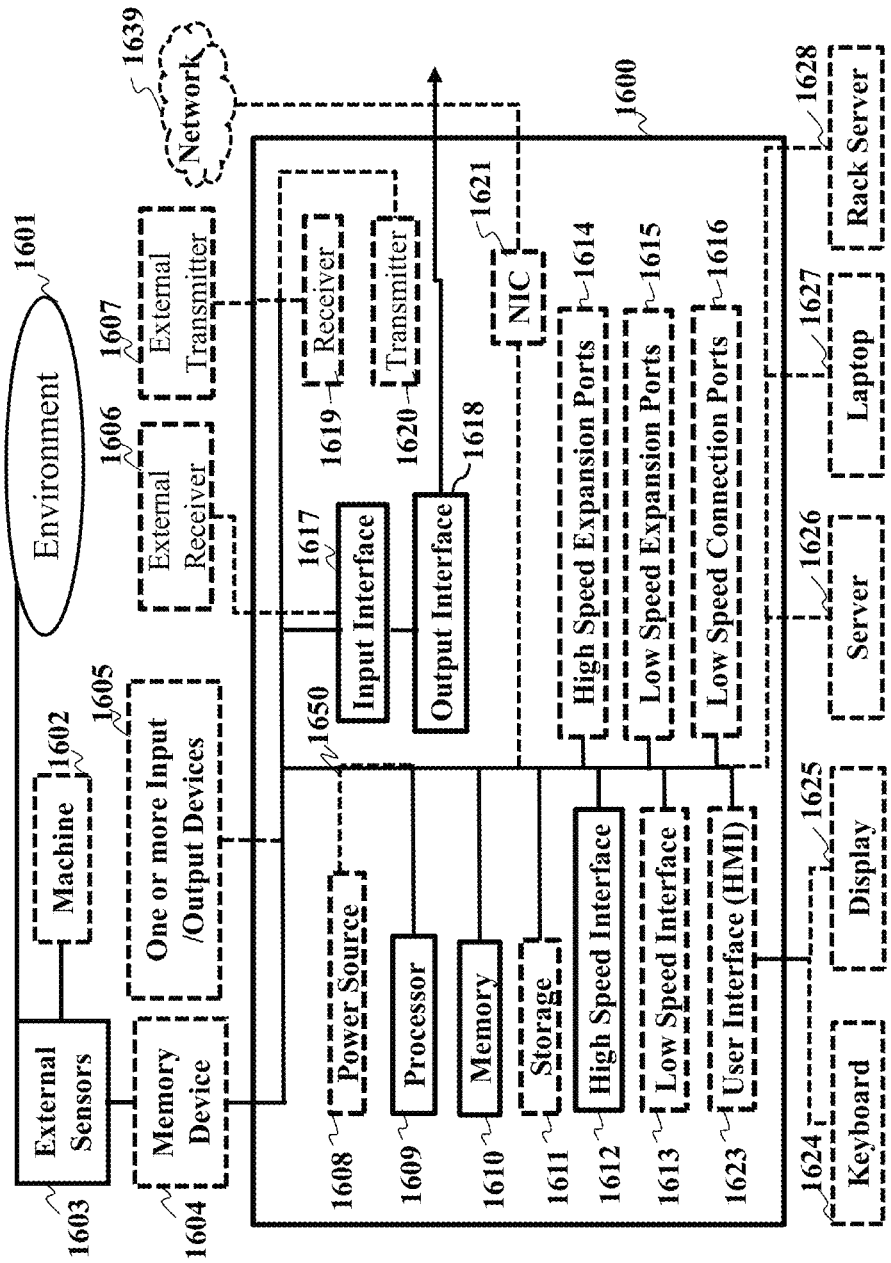
FIG. 16 is a schematic illustrating a computing apparatus that can be used to implement some techniques of the methods and systems, according to some embodiments of the present disclosure.

FIG. 16 is a schematic illustrating by non-limiting example a computing apparatus 1600 that can be used to implement some techniques of the methods and systems, according to embodiments of the present disclosure. The computing apparatus or device 1500 represents various forms of digital computers, such as laptops, desktops, workstations, personal digital assistants, servers, blade servers, mainframes, and other appropriate computers.

The computing device 1600 can include a power source 1608, a processor 1609, a memory 1610, a storage device 1611, all connected to a bus 1650. Further, a high-speed interface 1612, a low-speed interface 1613, high-speed expansion ports 1614 and low speed connection ports 1615, can be connected to the bus 1650. Also, a low-speed expansion port 1616 is in connection with the bus 1650. Contemplated are various component configurations that may be mounted on a common motherboard, by non-limiting example, 1630, depending upon the specific application. Further still, an input interface 1617 can be connected via bus 1650 to an external receiver 1606 and an output interface 1618. A receiver 1619 can be connected to an external transmitter 1607 and a transmitter 1620 via the bus 1650. Also connected to the bus 1650 can be an external memory 1604, external sensors 1603, machine(s) 1602 and an environment 1601. Further, one or more external input/output devices 1605 can be connected to the bus 1650. A network interface controller (NIC) 1621 can be adapted to connect through the bus 1650 to a network 1622, wherein data or other data, among other things, can be rendered on a third party display device, third party imaging device, and/or third party printing device outside of the computer device 1600.

Contemplated is that the memory 1610 can store instructions that are executable by the computer device 1600, historical data, and any data that can be utilized by the methods and systems of the present disclosure. The memory 1610 can include random access memory (RAM), read only memory (ROM), flash memory, or any other suitable memory systems. The memory 1610 can be a volatile memory unit or units, and/or a non-volatile memory unit or units. The memory 1610 may also be another form of computer-readable medium, such as a magnetic or optical disk.

Still referring to FIG. 16, a storage device 1611 can be adapted to store supplementary data and/or software modules used by the computer device 1600. For example, the storage device 1611 can store historical data and other related data as mentioned above regarding the present disclosure. Additionally, or alternatively, the storage device 1611 can store historical data similar to data as mentioned above regarding the present disclosure. The storage device 1611 can include a hard drive, an optical drive, a thumb-drive, an array of drives, or any combinations thereof. Further, the storage device 1611 can contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1609), perform one or more methods, such as those described above.

The system can be linked through the bus 1650 optionally to a display interface or user Interface (HMI) 1623 adapted to connect the system to a display device 1625 and keyboard 1624, wherein the display device 1625 can include a computer monitor, camera, television, projector, or mobile device, among others.

Still referring to FIG. 16, the computer device 1600 can include a user input interface 1617 adapted to a printer interface (not shown) can also be connected through bus 1650 and adapted to connect to a printing device (not shown), wherein the printing device can include a liquid inkjet printer, solid ink printer, large-scale commercial printer, thermal printer, UV printer, or dye-sublimation printer, among others.

The high-speed interface 1612 manages bandwidth-intensive operations for the computing device 1600, while the low-speed interface 1613 manages lower bandwidth-intensive operations. Such allocation of functions is an example only. In some implementations, the high-speed interface 1612 can be coupled to the memory 1610, a user interface (HMI) 1623, and to a keyboard 1624 and display 1625 (e.g., through a graphics processor or accelerator), and to the high-speed expansion ports 1614, which may accept various expansion cards (not shown) via bus 1650. In the implementation, the low-speed interface 1613 is coupled to the storage device 1611 and the low-speed expansion port 1615, via bus 1650. The low-speed expansion port 1615, which may include various communication ports (e.g., USB, Bluetooth, Ethernet, wireless Ethernet) may be coupled to one or more input/output devices 1605, and other devices a keyboard 1624, a pointing device (not shown), a scanner (not shown), or a networking device such as a switch or router, e.g., through a network adapter.

Still referring to FIG. 16, the computing device 1600 may be implemented in a number of different forms, as shown in the figure. For example, it may be implemented as a standard server 1626, or multiple times in a group of such servers. In addition, it may be implemented in a personal computer such as a laptop computer 1627. It may also be implemented as part of a rack server system 1628. Alternatively, components from the computing device 1600 may be combined with other components in a mobile device (not shown).

EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for scheduling of early riders (ERs) and late riders (LRs), wherein the LRs are unknown at a time the ERs are scheduled, to vehicles including commuter vehicles (CV) in a multi-modal transportation network (MTN), comprising:
a processor connected to an interface and a memory, stored in the memory is MTN data and ER itinerary requests, and instructions that, when executed by the processor, cause the processor to perform acts including:
forecasting a finite set of scenarios, each scenario including a possible set of forecast LRs (FLRs) itinerary requests;
iteratively, generate ER groups and FLR groups for each scenario, based on a desired time of arrival at a destination;
assign a CV for each ER and FLR group in each scenario;
iteratively, determine for each ER and FLR group a start time and an arrival time at the destination in the corresponding CV, for which, the ER and FLR group are assigned, wherein a total number of riders of all groups traveling in a CV at any given time does not exceed a capacity of the CV, and there exists a route that takes riders from their location to their destination;
continue iterations until a joint schedule for the ERs and the FLRs form each scenario that minimizes an objective function; and
formulate assignment information, and transmit, via the interface, the assignment information to the ERs and the assigned CVs.

2. The system of claim 1, wherein the number of CVs concurrently serving the ER groups and the FLR groups from each scenario is less than a fleet capacity.

3. The system of claim 1, wherein the finite set of scenarios are generated from past ERs and past LRs completed travel obtained from the MTN data.

4. The system of claim 1, wherein the number of FLRs for each scenario is a preset number of LRs provided by an operator and the FLRs locations and a desired time window of arrival at the destination are obtained from the past LRs travel obtained from the stored MTN data.

5. The system of claim 1, wherein the FLR travel is realized travel by past LRs at an approximate time of day, as an intended time of travel of the ERs per the received ERs travel requests.

6. The system of claim 1, wherein for each ER group in the ER groups includes at least one route for the CV, a start time for that route, such that an arrival deadline of each ER in the ER groups is satisfied.

7. The system of claim 1, wherein the total travel time for the rider is a sum of an amount of travel time a rider spent riding in one or more mode of transportation of the MTN, an amount of time the rider spent waiting for the assigned CV at an intermediate location, a terminal station or a station depot of the MTN, and an amount of time spent traveling in the CV to reach the rider target destination.

8. The method of claim 1, wherein the iteration processes for generating the ER groups, and FLR groups for each scenario, and the assigning the CVs and scheduling the CV trips is based on solving an optimization under uncertainty problem.

9. The method of claim 8, wherein the optimization under uncertainty problem is one of a multi-stage stochastic optimization problem or a robust optimization problem.

10. The system of claim 8, wherein the objective function is an expected value of a metric that uses a weighting factor between a total rider waiting time and a number of CV trips.

11. The system of claim 8, wherein the optimization under uncertainty problem includes constraints to ensure that ERs reach their target destination within the arrival time windows of the ERs and ensures that a number of ERs in each of the ER groups is smaller than a maximum capacity number of seats in the CVs, that a route-search program and an operation route map program provide respective travel times for the CVs, wherein the constraints ensure that a number of CVs operating simultaneously is smaller than a total number of available CVs in a fleet of the MTN.

12. The system of claim 1, wherein each scenario of the FLRs represents a likely materialization of an amount of expected LRs that will be used to ensure that the scheduling of the ERs provides for a capability of scheduling the LRs at a later time.

13. The system of claim 1, wherein the LRs provide itinerary requests at a later time than a time at which the ERs itinerary requests are received by the MTN, such that each LR and ER itinerary request includes an origin location, a destination and a desired time window of arrival at the destination.

14. The system of claim 1, wherein a CV trip includes one of, the CV starting from a location to a destination, the CV starting from the destination to the location, or both.

15. The system of claim 1, wherein the desired time used to generate the ER groups and the FLR groups for each scenario is within a time window of an arrival time at the destination.

16. The system of claim 1, wherein the assignment information includes the assigned CVs to the ER groups, the routes assigned to the CVs, locations and start times of the assigned CVs from the locations.

17. A method for scheduling of early riders (ERs) and late riders (LRs), wherein the LRs are unknown at a time the ERs are scheduled, to commuter vehicles (CVs) associated with a transportation system (TS), comprising:
receiving ERs itinerary requests via an interface;
executing, by a processor connected to the interface and a memory, instructions stored in the memory to cause the processor to perform acts including:
forecasting a finite set of scenarios, each scenario including a possible set of Forecast LRs (FLRs) itinerary requests, wherein the finite set of scenarios are generated from past ERs and past LRs completed travel obtained from TS data stored in the memory;
iteratively, generating ER groups and FLR groups for each scenario, based on a desired time of arrival at a destination, such that a number of CVs concurrently serving the ER groups and the LR groups is less than a fleet capacity;
assigning a CV for each ER and FLR group in each scenario of the finite set of scenarios;
iteratively, determining for each ER and FLR group a start time and an arrival time at the destination in the corresponding CV, for which, the ER and FLR group are assigned, wherein a total number of riders of all groups traveling in a CV at any given time does not exceed a capacity of the assigned CV, and there exists a route that takes riders from their location to their destination;
continuing the iterations until a joint schedule for the ERs and the FLRs form each scenario that minimizes an objective function of a metric that is a combination between a total rider waiting time and a number of CV trips; and
formulating assignment information, and transmitting, via the interface, the assignment information to the ERs and the assigned CVs.

18. A system for scheduling of early riders (ERs) and late riders (LRs), wherein the LRs are unknown at a time after the ERs are scheduled, to commuter vehicles CVs associated with a transportation system (TS), comprising:
a memory including stored TS data and instructions;
an interface to receive ERs itinerary requests;
at least one processor connected to the interface and the memory, such that the stored instructions, when executed by the at least one processor, cause the at least one processor to perform acts including:
forecast a finite set of scenarios, each scenario including a possible set of Forecast LRs (FLRs) itinerary requests;
iteratively, generate ER groups and FLR groups for each scenario, based on a desired time of arrival at a destination, such that a number of CVs concurrently serving the ER groups and the LR groups is less than a fleet capacity;
assign a CV for each ER and FLR group in each scenario of the finite set of scenarios;
iteratively, determine for each ER and FLR group a start time and an arrival time at the destination in the corresponding assigned CV, for which, the ER and FLR group are assigned, wherein a total number of riders of all groups traveling in a CV at any given time does not exceed a capacity of the assigned CV, and there exists a route that takes riders from their location to their destination,
wherein the iterations continue until a joint schedule for the ERs and the FLRs form each scenario that minimizes an objective function of a metric that is a combination between a total rider waiting time and a number of CV trips; and
formulate assignment information, and transmit, via the interface, the assignment information to the ERs and the assigned CVs.

19. The system of claim 18, wherein the finite set of scenarios is generated from past ERs and past LRs completed travel obtained from the TS data.

20. The system of claim 18, wherein the CV is associated with, or part of, one of a private multi-modal transportation network (MTN), a private rider multi transportation system, an airport rider transportation system, a rider transportation system of at least one business or a rider sharing transportation system.

21. A system for scheduling of early riders (ERs) and late riders (LRs), wherein the LRs are unknown at a time the ERs are scheduled, to vehicles in a multi-modal transportation network (MTN), comprising:
at least one processor connected to an interface and a memory, stored in the memory is MTN data and instructions that, when executed by the at least one processor, cause the at least one processor to perform acts including:
forecasting a finite set of scenarios, each scenario including a possible set of forecast LRs (FLRs)

itinerary requests, wherein the finite set of scenarios is generated from past ERs and past LRs completed travel obtained from the MTN data;

receive ER itinerary requests via the interface, wherein the ER itinerary requests includes one of a lowest fare, a shortest travel time or a shortest travel distance;

iteratively, generate ER groups from the ER itinerary requests, and FLR groups for each scenario, based on a desired time of arrival at the target destination, and assign a commuter vehicle (CV) for each ER and FLR group in each scenario so that a number of seats occupied by ER passengers in the CV and a number of FLRs assigned not exceed a maximum seating capacity of the CV to ensure that the ER passengers and assigned FLR passengers have seating, wherein the number of CVs that are concurrently serving the ER groups and the LR groups is less than a fleet capacity;

iteratively, determine for each ER and FLR group a start time and an arrival time at the target destination in the corresponding CV, for which, the ER and FLR group are assigned, wherein a total number of riders of all groups traveling in a CV at any given time does not exceed a capacity of the CV, and there exists a route that takes riders from their transfer station to their target destination;

continue the iterations until a joint schedule for the ERs and the FLRs form each scenario that minimizes an expectation of a metric that is a combination between a total rider waiting time and a number of CV trips;

formulate assignment information, and transmit, via the interface, the assignment information to communication devices associated with the ERs and the assigned CVs;

receive LR itinerary requests via the interface;

iteratively, generate LR groups from the received LR itinerary requests, based on the received LR itinerary requests target destination, wherein the LR itinerary requests includes one of a lowest fare, a shortest travel time or a shortest travel distance;

assign a commuter vehicle (CV) for each LR group;

iteratively, determine for each LR group, a period of time including a start time and an arrival time at the target destination in the corresponding CV, providing that the CV for that LR group is either, not in use by any ER group for that time period and that there is a rider capacity in the CV to transport all the riders in the LR group, or an ER group using the CV at the same time and that there is a rider capacity in the CV to transport all the riders in the ER and LR groups;

continue the iterations until a joint schedule for the LRs conditioned on the determined schedule of the ERs, minimizes an objective function of a metric that is a combination between a total LR waiting time and a number of CV trips;

formulate an updated assignment information, and transmit, via the interface, the updated assignment information to the communication devices associated with the ERs, the LRs and the assigned CVs; and receive the updated assignment information by the assigned CVs communication devices, wherein the updated assignment information is implemented by assigned CVs according to the updated assignment information.

* * * * *